(12) United States Patent
Ono et al.

(10) Patent No.: US 11,539,860 B2
(45) Date of Patent: Dec. 27, 2022

(54) INFORMATION PROCESSING APPARATUS, IMAGE FORMING APPARATUS, INFORMATION PROCESSING METHOD, AND IMAGE FORMING METHOD

(71) Applicants: Hirofumi Ono, Kanagawa (JP); Yutaka Ohmiya, Tokyo (JP); Hideki Hashimoto, Tokyo (JP)

(72) Inventors: Hirofumi Ono, Kanagawa (JP); Yutaka Ohmiya, Tokyo (JP); Hideki Hashimoto, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 17/469,877

(22) Filed: Sep. 9, 2021

(65) Prior Publication Data

US 2022/0086307 A1 Mar. 17, 2022

(30) Foreign Application Priority Data

Sep. 16, 2020 (JP) .............................. JP2020-155696

(51) Int. Cl.
*H04N 1/409* (2006.01)
*H04N 1/00* (2006.01)

(52) U.S. Cl.
CPC ....... *H04N 1/4095* (2013.01); *H04N 1/00811* (2013.01); *H04N 1/00814* (2013.01)

(58) Field of Classification Search
CPC ............. H04N 1/4095; H04N 1/00814; G03G 15/5062
See application file for complete search history.

(56) References Cited

U.S. PATENT DOCUMENTS

| 5,864,353 | A | * | 1/1999 | Gila | ................... | G03G 15/5062 |
| | | | | | | 347/115 |
| 5,887,125 | A | * | 3/1999 | Takano | .................. | H04N 1/047 |
| | | | | | | 358/1.12 |
| 6,288,733 | B1 | * | 9/2001 | Nakazawa | ......... | G03G 15/5041 |
| | | | | | | 399/72 |

(Continued)

FOREIGN PATENT DOCUMENTS

| EP | 1 463 296 A2 | 9/2004 |
| EP | 1463296 A2 * | 9/2004 | ............ B41J 29/393 |

(Continued)

OTHER PUBLICATIONS

U.S. Appl. No. 16/952,103, filed Nov. 19, 2020.

(Continued)

*Primary Examiner* — Ted W Barnes
(74) *Attorney, Agent, or Firm* — Xsensus LLP

(57) ABSTRACT

An information processing apparatus is configured to perform information processing on a target. The information processing apparatus includes one or more processors; and one or more memories storing program instructions that cause the one or more processors to perform a plurality of processes, the plurality of processes including a first process of adding information to the target and a second process of obtaining the information; control each of the plurality of processes; and perform a correcting process of concurrently performing corrections with respect to the plurality of processes.

12 Claims, 21 Drawing Sheets

(56) References Cited

U.S. PATENT DOCUMENTS

| | | | |
|---|---|---|---|
| 7,941,068 B2 | 5/2011 | Kimura | |
| 8,797,606 B2 | 8/2014 | Hashimoto et al. | |
| 9,025,216 B2 | 5/2015 | Hashimoto et al. | |
| 9,429,470 B2 | 8/2016 | Hashimoto et al. | |
| 9,661,177 B2 | 5/2017 | Hashimoto et al. | |
| 9,930,195 B2 | 3/2018 | Shirado et al. | |
| 10,091,383 B2 | 10/2018 | Goh et al. | |
| 10,129,424 B2 | 11/2018 | Yabuuchi et al. | |
| 10,182,177 B2 | 1/2019 | Sasa et al. | |
| 10,298,866 B2 | 5/2019 | Hashimoto et al. | |
| 10,356,272 B2 | 7/2019 | Hashimoto et al. | |
| 10,404,883 B2 * | 9/2019 | Anezaki | H04N 1/0057 |
| 10,554,849 B2 | 2/2020 | Hashimoto et al. | |
| 10,735,625 B2 | 8/2020 | Nakazawa et al. | |
| 10,827,101 B2 | 11/2020 | Hashimoto et al. | |
| 2003/0218671 A1* | 11/2003 | Nagafusa | B41J 2/44 347/246 |
| 2004/0240894 A1* | 12/2004 | Tomita | G03G 15/5062 399/17 |
| 2007/0064088 A1* | 3/2007 | Izumiya | H04N 1/393 347/261 |
| 2009/0190181 A1* | 7/2009 | Oh | H04N 1/4095 358/3.23 |
| 2013/0038672 A1 | 2/2013 | Ohmiya | |
| 2013/0155428 A1* | 6/2013 | Mizuno | G06K 15/02 358/1.9 |
| 2014/0002564 A1* | 1/2014 | Miyadera | G03G 13/04 347/118 |
| 2014/0072315 A1* | 3/2014 | Oh | G03G 15/5041 399/49 |
| 2014/0072351 A1* | 3/2014 | Nishina | G03G 13/01 399/301 |
| 2014/0125752 A1* | 5/2014 | Miyadera | G03G 15/043 347/118 |
| 2014/0153010 A1* | 6/2014 | Miyadera | H04N 1/02815 358/1.9 |
| 2014/0153943 A1* | 6/2014 | Miyadera | G03G 15/0189 399/49 |
| 2015/0110515 A1* | 4/2015 | Yamasaki | G03G 15/55 399/81 |
| 2015/0244901 A1* | 8/2015 | Toriyabe | H04N 1/00084 358/1.2 |
| 2015/0294204 A1* | 10/2015 | Kishi | G06K 15/027 358/1.9 |
| 2016/0112581 A1* | 4/2016 | Kishi | H04N 1/6033 358/504 |
| 2017/0219951 A1* | 8/2017 | Kamatani | G03G 15/04072 |
| 2017/0280001 A1* | 9/2017 | Furuta | H04N 1/113 |
| 2018/0262639 A1* | 9/2018 | Anezaki | G03G 15/5062 |
| 2019/0004463 A1* | 1/2019 | Guttman | H04N 1/6033 |
| 2019/0187600 A1* | 6/2019 | Goto | G03G 15/5062 |
| 2019/0238717 A1* | 8/2019 | Inage | H04N 1/4078 |
| 2020/0304689 A1* | 9/2020 | Takei | H04N 1/00037 |
| 2020/0410271 A1 | 12/2020 | Nakazawa et al. | |
| 2020/0412904 A1 | 12/2020 | Ohmiya et al. | |
| 2021/0014441 A1 | 1/2021 | Ohmiya et al. | |
| 2021/0021716 A1* | 1/2021 | Hagiwara | H04N 1/00572 |
| 2021/0150290 A1* | 5/2021 | Yokote | G06K 15/16 |

FOREIGN PATENT DOCUMENTS

| | | | |
|---|---|---|---|
| JP | 2002-330286 A | | 11/2002 |
| JP | 2002330286 A | * | 11/2002 |
| JP | 2008-268596 | | 11/2008 |
| JP | 2011-010050 A | | 1/2011 |
| JP | 2011010050 A | * | 1/2011 |
| JP | 2017-019201 | | 1/2017 |
| JP | 2017019201 A | * | 1/2017 |
| JP | 2018-074516 A | | 5/2018 |
| JP | 2018074516 A | * | 5/2018 |
| JP | 6488926 | | 3/2019 |
| JP | 6488926 B2 | * | 3/2019 |

OTHER PUBLICATIONS

U.S. Appl. No. 17/141,240, filed Jan. 5, 2021.
U.S. Appl. No. 17/340,121, filed Jun. 7, 2021.
Extended European Search Report dated Jan. 21, 2022 in European Patent Application No. 21196044.8, 8 pages.

* cited by examiner

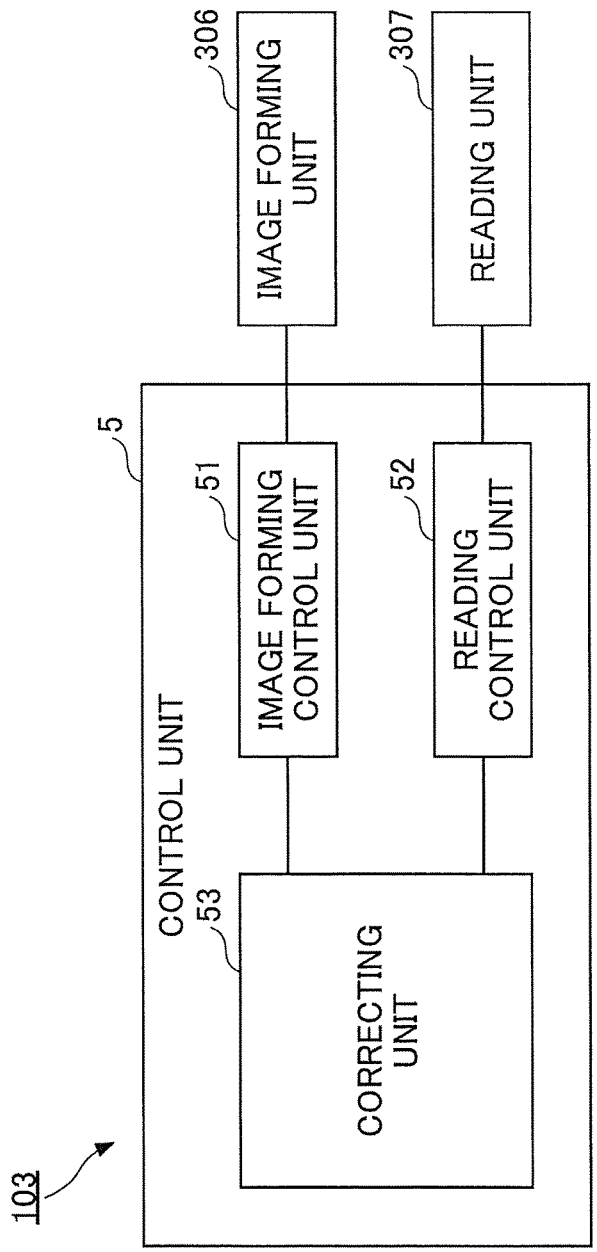

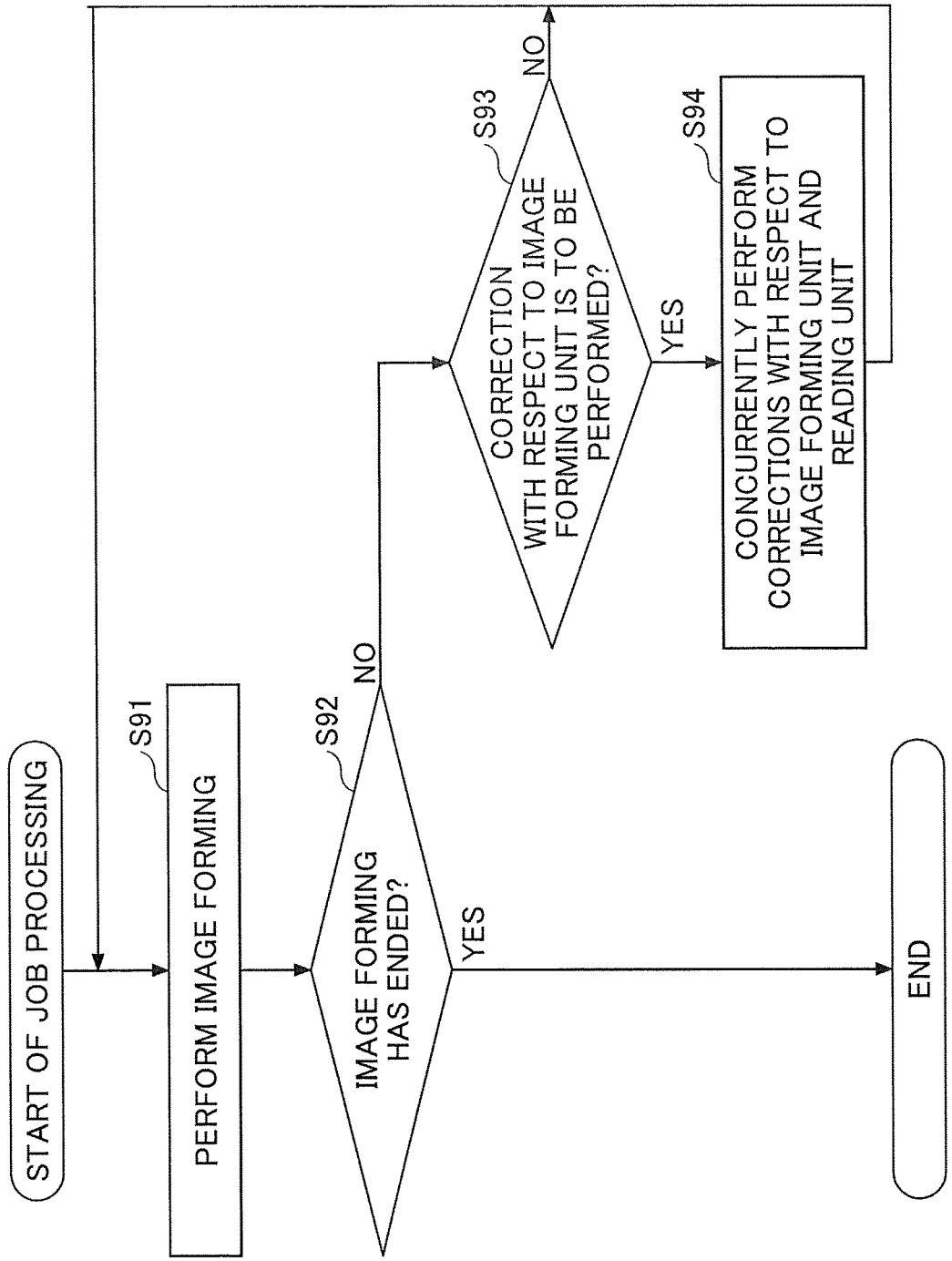

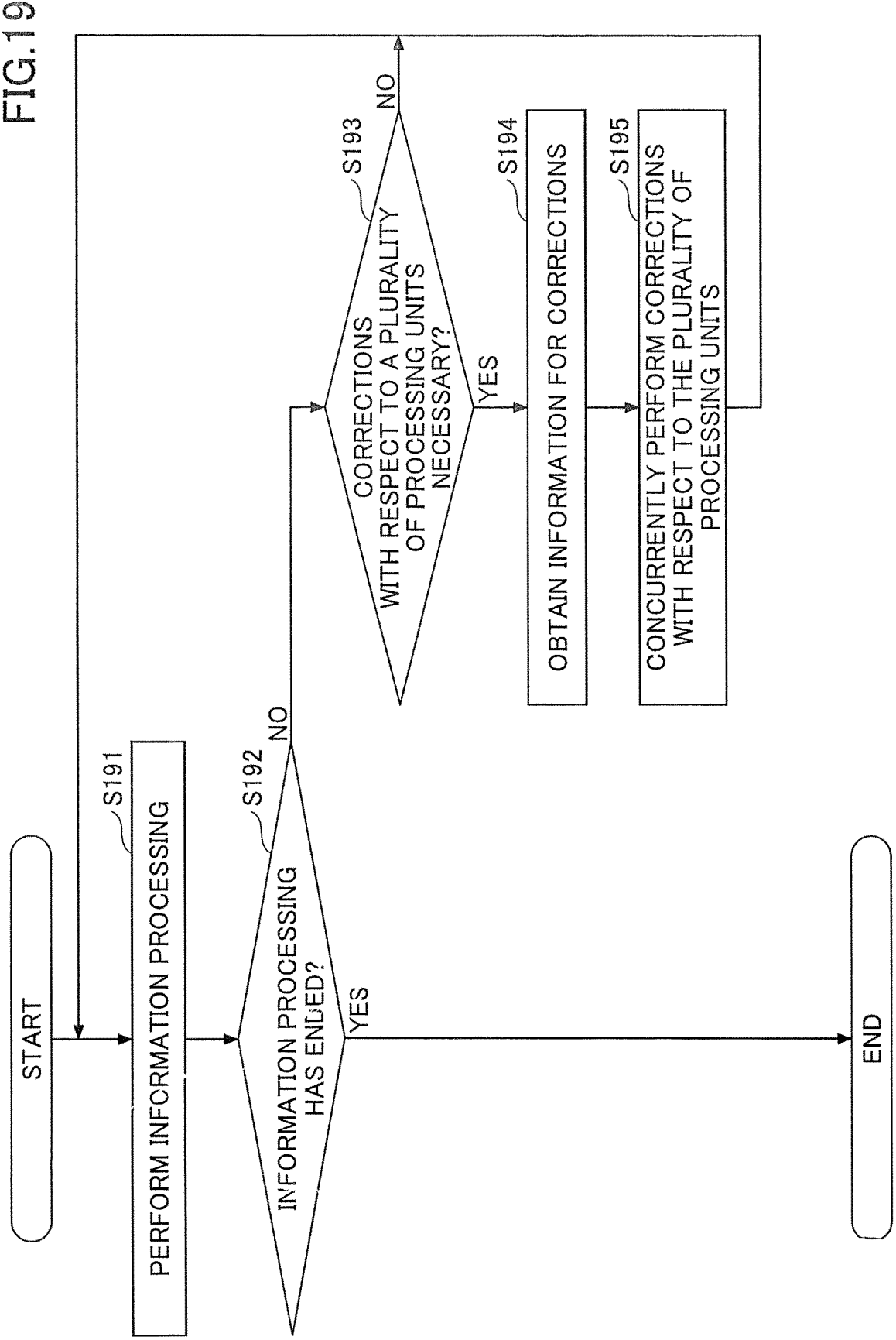

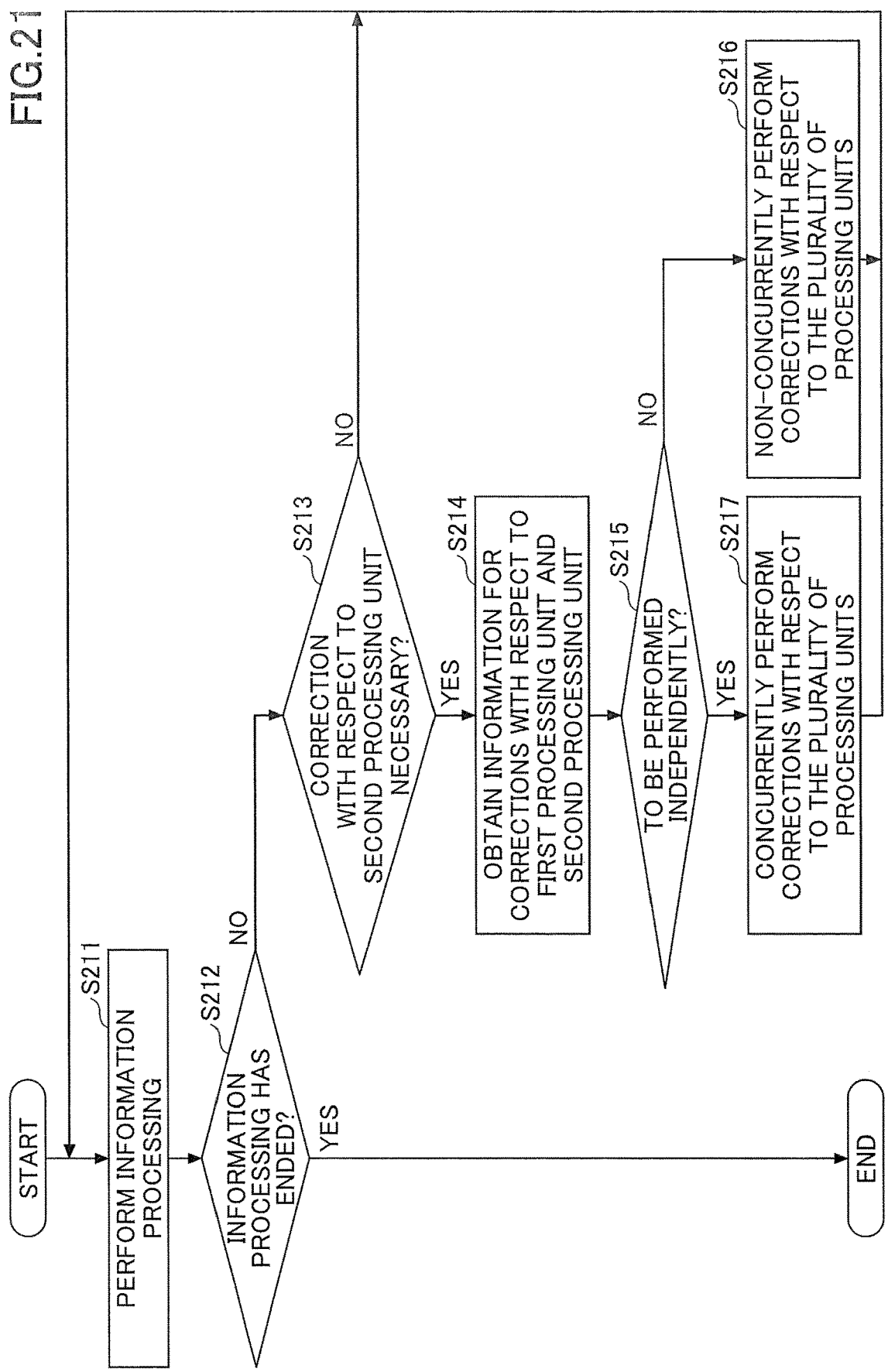

INFORMATION PROCESSING APPARATUS, IMAGE FORMING APPARATUS, INFORMATION PROCESSING METHOD, AND IMAGE FORMING METHOD

CROSS-REFERENCE TO RELATED APPLICATION

The present application is based on and claims priority under 35 U.S.C. § 119 to Japanese Patent Application No. 2020-155696, filed Sep. 16, 2020. The contents of Japanese Patent Application No. 2020-155696 are incorporated herein by reference in their entirety.

BACKGROUND OF THE INVENTION

1. Field of the Invention

The present invention relates to an information processing apparatus, an image forming apparatus, an information processing method, and image forming method.

2. Description of the Related Art

In the related art, an image forming apparatus that forms an image on a recording medium is one example of an information processing apparatus that performs information processing on a target.

The image forming apparatus may include an image forming unit (a first processing unit) forming an image on the recording medium, a reading unit (a second processing unit) reading the image, and a control unit controlling the image forming unit and the reading unit. For example, a configuration where a timing of correcting the reading unit is optimized in order to avoid productivity deterioration of the image forming apparatus is disclosed (see, for example, Japanese Unexamined Patent Application Publication No. 2017-019201).

SUMMARY OF THE INVENTION

An information processing apparatus according to one aspect of the present invention is configured to perform information processing on a target. The information processing apparatus includes one or more processors; and one or more memories storing program instructions that cause the one or more processors to perform a plurality of processes, the plurality of processes including a first process of adding information to the target and a second process of obtaining the information; control each of the plurality of processes; and perform a correcting process of concurrently performing corrections with respect to the plurality of processes.

Other objects, features, and advantages of the present invention will become more apparent from the following detailed description when read in conjunction with the accompanying drawings.

BRIEF DESCRIPTION OF THE DRAWINGS

FIG. 7 is a block diagram depicting the functional configuration of the image forming apparatus according to the first embodiment;

FIG. 9 is a flow diagram depicting an operation example of the image forming apparatus according to the first embodiment;

FIG. 19 is a flow diagram depicting a first example of the operations of the information processing apparatus according to the fifth embodiment;

FIG. 21 is a flow diagram depicting a second example of the operations of the information processing apparatus according to the fifth embodiment;

DESCRIPTION OF THE EMBODIMENTS

Figure 1:
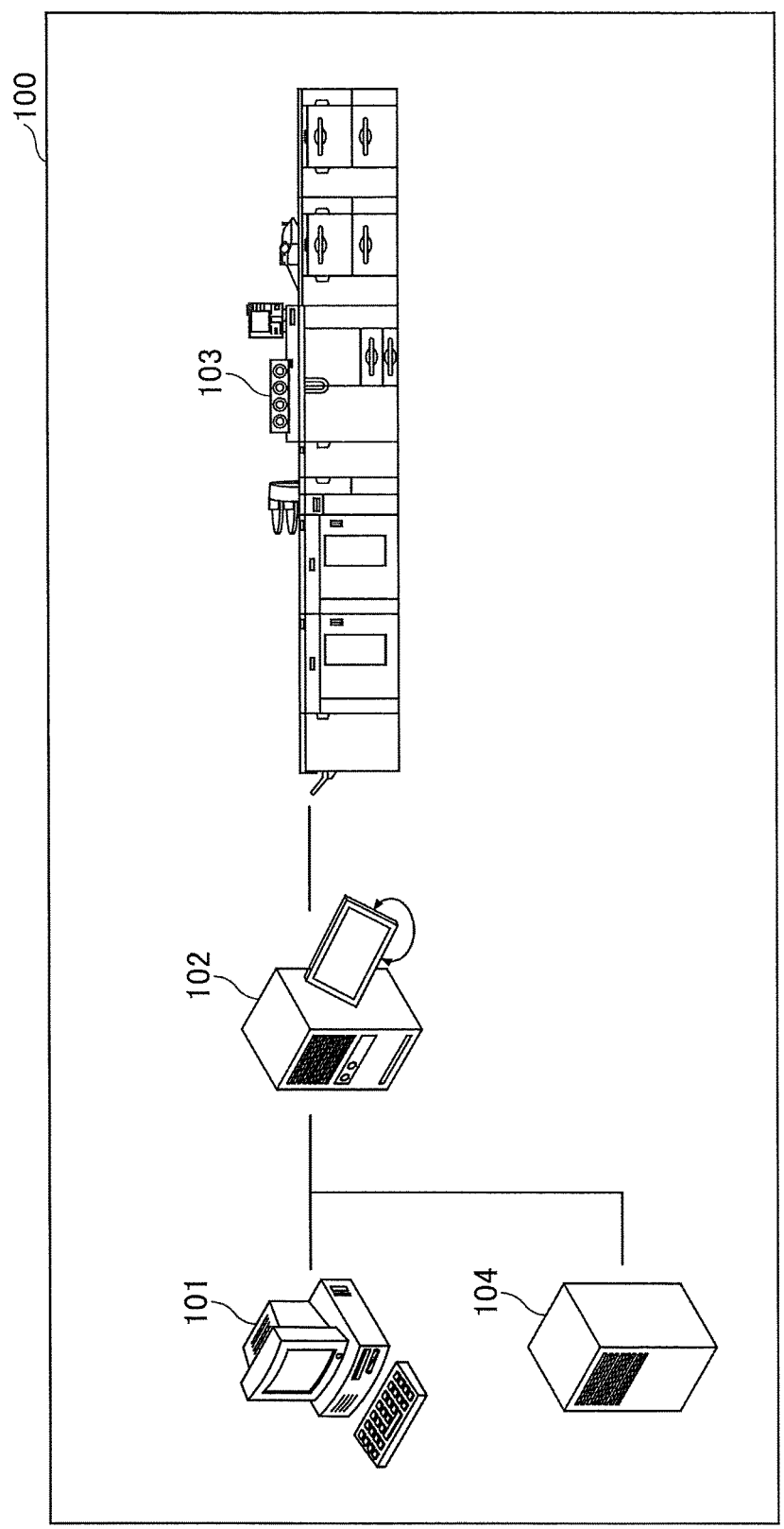
FIG. 1 depicts an example configuration of an image forming system according to embodiments.

In the related art disclosed in Japanese Unexamined Patent Application Publication No. 2017-019201, it may be impossible to improve the productivity of the information processing apparatus.

An object of embodiments of the present invention is to improve a productivity of an information processing apparatus.

According to the embodiments of the present invention, the productivity of the information processing apparatus can be improved.

Hereinafter, the embodiments will be described with reference to the drawings. In each drawing, the same components are denoted by the same reference numerals, and overlapping descriptions are omitted accordingly.

With reference to the embodiments, examples of an information processing apparatus for implementing the present invention will be described. In this regard, the present invention is not limited to the described embodiments. Unless otherwise specifically described to do so, the shapes, relative positional relationships, and parameter values of the components described below are not intended to limit the scope of the present invention, but are intended only as examples. In addition, the sizes and positional relationships of the members depicted in the drawings may be exaggerated for the purpose of clarification.

Information processing apparatuses according to the embodiments are information processing apparatuses that perform information processing on a target, and includes a plurality of processing units including a first processing unit that adds information to the target, a second processing unit that obtains information added by the first processing unit, and a control unit that controls each of the plurality of processing units.

For example, the information processing apparatuses according to the embodiments are image forming apparatuses that form an image on a recording medium; and the first processing unit is an image forming unit, and the second processing unit is a reading unit that reads the image formed on the recording medium.

In the embodiments, the control unit includes a correcting unit for performing a correction with respect to each of the plurality of processing units, and the correcting unit concurrently performs corrections with respect to the plurality of processing units. When corrections with respect to the plurality of processing units are thus concurrently performed, the time required for the corrections is shorter in comparison to a case where the corrections are non-concurrently performed. Thus, according to the embodiments, it is possible to improve the productivity of the information processing apparatuses.

Hereinafter, the embodiments will be described using image forming apparatuses as examples of information processing apparatuses, and image forming systems including image forming apparatuses will be described for example. The terms "printing" and "image forming" are synonymous with respect to the embodiments.

<Example of Overall Configuration of Image Forming System 100>

First, an example of the configuration of an image forming system 100 will be described with reference to FIG. 1. FIG. 1 is a diagram depicting an example of the configuration of an image forming system 100. As depicted in FIG. 1, the image forming system 100 includes a client personal computer (PC) 101, a digital front end (DFE) 102, an image forming apparatus 103, and an administrative server 104. These apparatuses are connected for communication or telecommunication to each other via the Internet or the like.

The client PC 101 generates a print job that a user wants to execute and transmits the print job to the DFE 102 or the administrative server 104. The client PC 101 includes a display, which is a liquid crystal display, and input devices such as a mouse and a keyboard.

The DFE 102 receives the print job from the client PC 101 or the administrative server 104, generates rendering data by a raster image processor (RIP) engine based on the received print job, and transmits the rendering data to the image forming apparatus 103.

The image forming apparatus 103 forms an image on a recording medium based on the rendering data received from the DFE 102.

The administrative server 104 manages the print job received from the client PC 101. At a request of the DFE 102, the print job is transmitted to the DFE 102.

To the image forming system 100, a plurality of image forming apparatuses and/or a plurality of client PCs may be connected in a communicable or tele-communicable manner.

<Example of Hardware Configuration of DFE 102>

Figure 2:
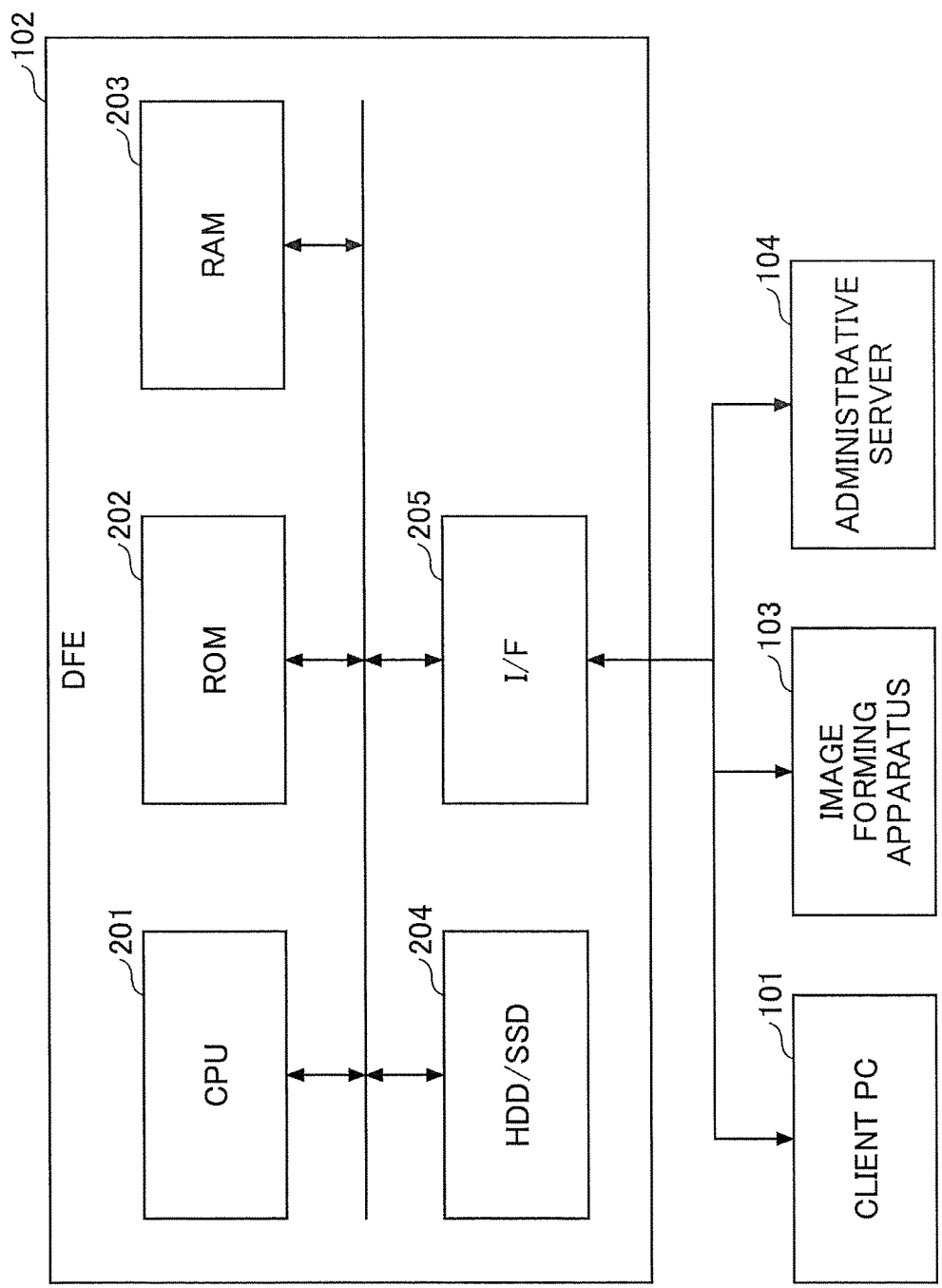
FIG. 2 is a block diagram depicting an example of the hardware configuration of an image processing apparatus according to the embodiments.

Referring now to FIG. 2, the hardware configuration of the DFE 102 will be described. FIG. 2 is a block diagram depicting an example of the hardware configuration of the DFE 102.

As depicted in FIG. 2, the DFE 102 includes a central processing unit (CPU) 201, a read-only memory (ROM) 202, a random access memory (RAM) 203, a hard disk drive or solid state drive (HDD/SSD) 204, and an interface (I/F) 205.

The CPU 201 controls operations of the entire DFE 102 by using the RAM 203 as a working area and executing a program stored in the ROM 202.

The HDD/SSD 204 is used as a storage unit and stores preset setting values. Information stored in the HDD/SSD 204 may be used by the CPU 201 when the read program is executed.

The I/F 205 is an interface that enables communication or telecommunication of the DFE 102 with the client PC 101, the image forming apparatus 103, and the administrative server 104.

<Example of Hardware Configuration of Image Forming Apparatus 103>

Figure 3:
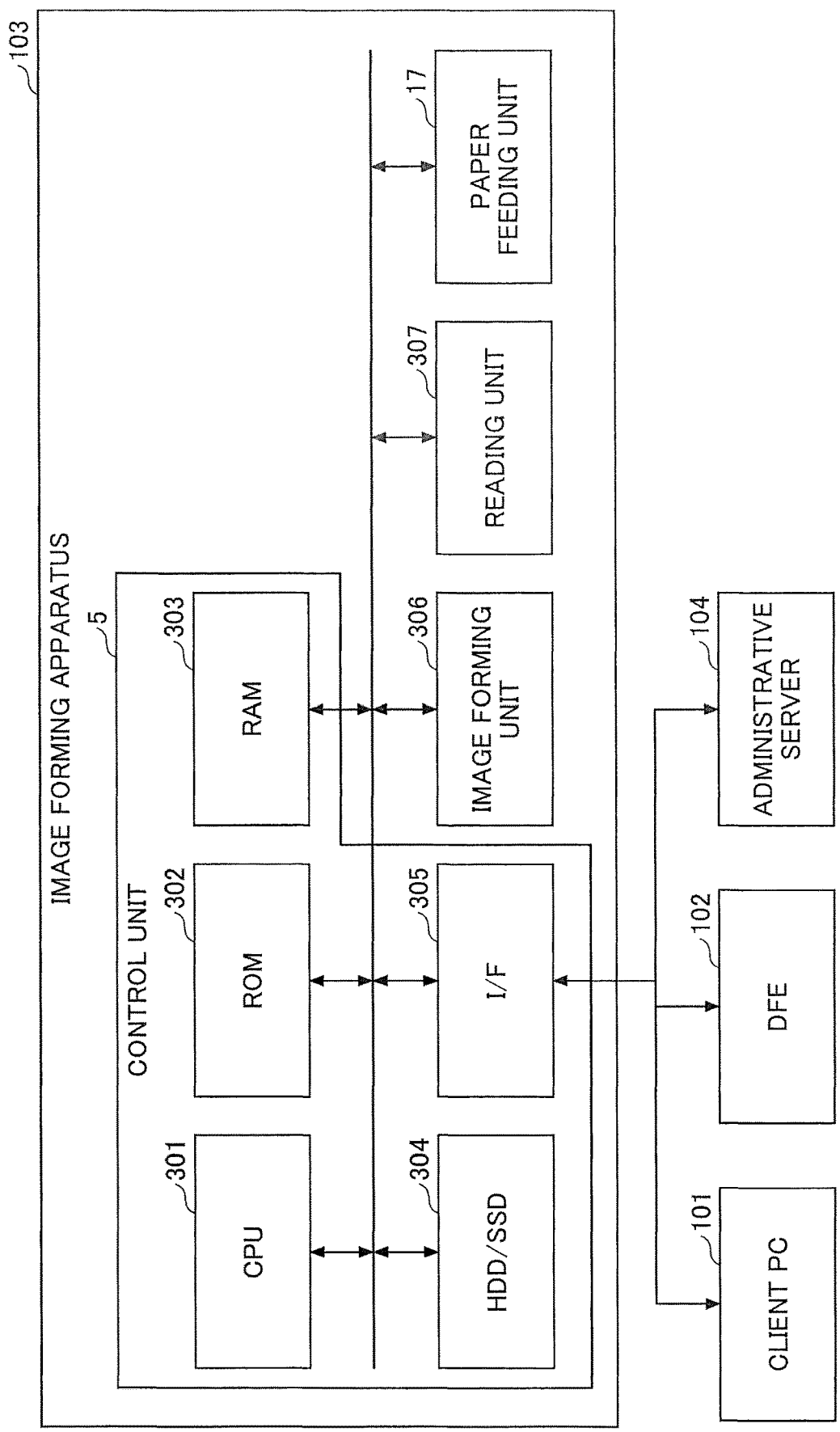
FIG. 3 is a block diagram depicting an example of the hardware configuration of an image forming apparatus according to the embodiments.

Next, the hardware configuration of the image forming apparatus 103 will be described with reference to FIG. 3. FIG. 3 is a block diagram depicting an example of the hardware configuration of the image forming apparatus 103.

As depicted in FIG. 3, the image forming apparatus 103 includes a CPU 301, a ROM 302, a RAM 303, a HDD/SSD 304, an I/F 305, an image forming unit 306, a reading unit 307, and a paper feeding unit 17.

The CPU 301 controls operations of the entire image forming apparatus 103 by using the RAM 303 as a work area and executing a program stored in the ROM 302.

The HDD/SSD 304 is used as a storage unit and stores preset setting values. Information stored in the HDD/SSD 304 may be used by the CPU 301 when the read program is executed.

The I/F 305 is an interface that enables communication or telecommunication of the image forming apparatus 103 with the DFE 102, the client PC 101, and the administrative server 104.

The image forming unit 306 is a printing engine that forms an image on a recording medium. The reading unit 307 is a reading device for reading the image formed on the recording medium. The image forming unit 306 and the reading unit 307 are examples of a plurality of processing units. The paper feeding unit 17 supplies a recording medium to the image forming unit 306.

The CPU 301, ROM 302, RAM 303, HDD/SSD 304, and I/F 305 are included in a control unit 5. The control unit 5 controls the plurality of processing units.

First Embodiment

<Example Configuration of Image Forming Apparatus 103>

Figure 4:
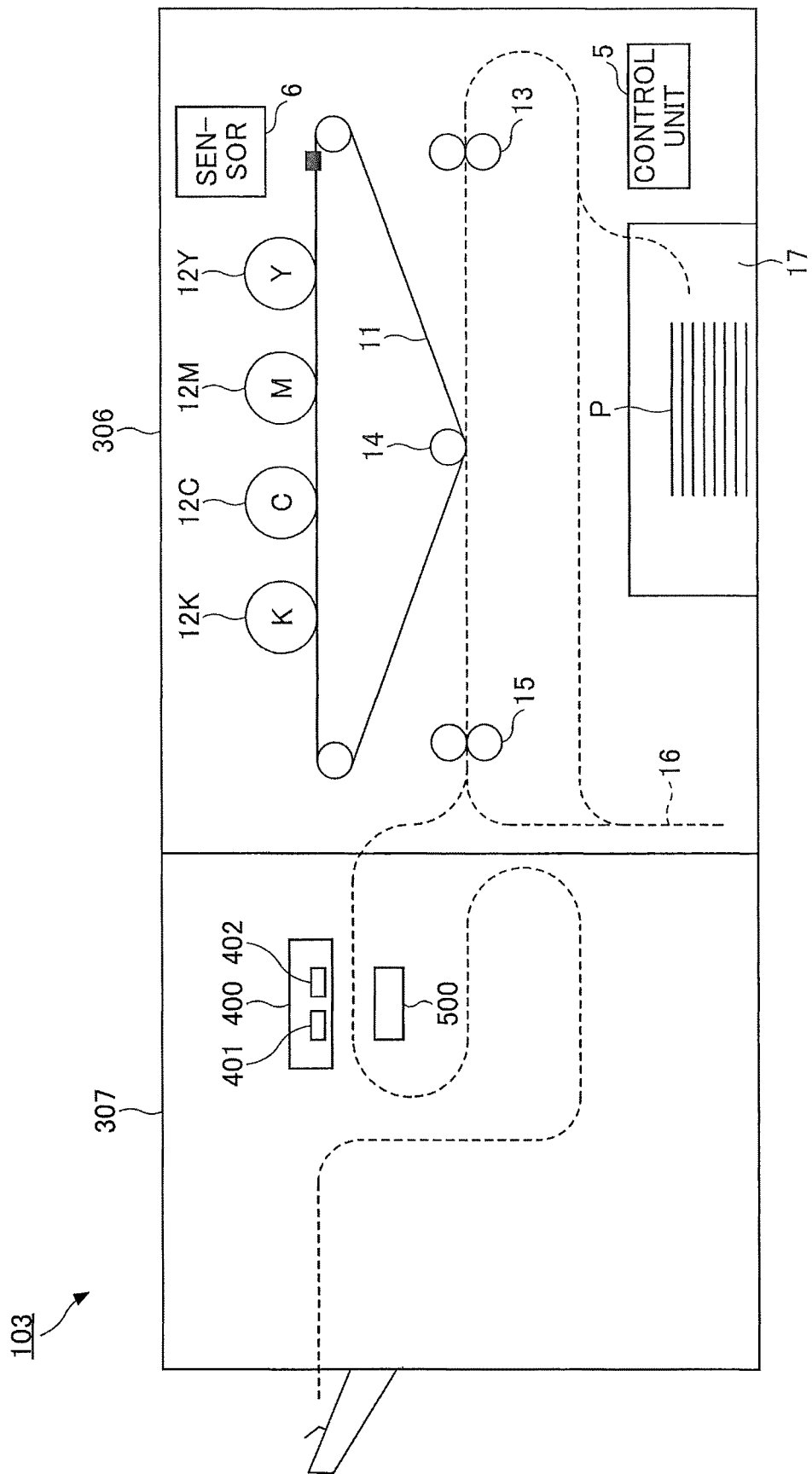
FIG. 4 is a diagram depicting an example configuration of an image forming apparatus according to a first embodiment.

Next, the configuration of the image forming apparatus 103 will be described with reference to FIG. 4. FIG. 4 is a diagram depicting an example of the configuration of the image forming apparatus 103. As depicted in FIG. 4, the image forming apparatus 103 includes the image forming unit 306 and the reading unit 307.

The image forming unit 306 is an example of a first processing unit that adds information to a target. The image forming unit 306 includes the control unit 5, a toner concentration sensor 6, an intermediate transfer belt 11, photosensitive drums 12K, 12C, 12M, and 12Y, a pair of conveying rollers 13, a secondary transfer roller 14, a fixing roller 15, a conveying path 16, and the paper feeding unit 17. The image forming unit 306 is an electrophotographic image forming device that forms an image on a sheet of paper P using toner. Here, the sheet of paper P is an example of a recording medium and is an example of a target. An image is an example of information to be added to a target by the first processing unit (the image forming unit 306).

The reading unit 307 is an example of a second processing unit which obtains information that the first processing unit has added to a target. The reading unit 307 includes an in-line sensor 400 and a background member 500, and is a reading device for reading an image formed on the sheet of paper P by the image forming unit 306. In FIG. 4, the configuration where the image forming unit 306 includes the control unit 5 is depicted, but, instead, the reading unit 307 may include the control unit 5. It is noted that there is no particular restriction on the positions where the control unit 5 is provided, and the installation position can be selected appropriately.

The image forming apparatus 103 is a so-called tandem-type image forming apparatus in which the photosensitive drums 12Y, 12M, 12C, and 12K (hereinafter, the photosensitive drums 12Y, 12M, 12C, and 12K will be generally referred to as photosensitive drums 12) of corresponding colors are arranged along the intermediate transfer belt 11 that is an endless moving member.

The image forming apparatus 103 conveys a sheet of paper P fed by the paper feeding unit 17 by the pair of conveying rollers 13. In the image forming apparatus 103, the photosensitive drums 12Y, 12M, 12C, and 12K are arranged in the stated order of from the upstream side of the intermediate transfer belt 11 along the conveying direction of the intermediate transfer belt 11. An intermediately transferred image to be transferred to the sheet of paper P is formed on the intermediate transfer belt 11.

The image forming apparatus 103 superimposes and transfers an image of each color developed by a corresponding toner on a surface of a corresponding photoconductor drum 12 of each color to the intermediate transfer belt 11 to form a full color image.

The image forming apparatus 103 transfers the full color image formed on the intermediate transfer belt 11 to the sheet of paper P conveyed through the conveying path 16 by the function of the secondary transfer roller 14 at the position closest to the conveying path 16 of the sheet of paper P depicted with a broken line in FIG. 4.

The image forming apparatus 103 further conveys the sheet of paper P on which the image is thus formed on the surface and thermally fixes the image onto the sheet of paper P at a position of the fixing roller 15. The fixing roller 15 fixes the image onto the sheet of paper P by heating and pressing the sheet of paper P onto which the full color image (the toner image) has been transferred. The fixing roller 15 generates heat by a heater such as a halogen heater provided in the fixing roller 15, so that the sheet of paper P and the toner can be heated.

When double-sided printing is performed, the image forming apparatus 103 forms an image on a first side of a sheet of paper P, then conveys the sheet of paper P to a reverse path included in the conveying path 16, inverts the sheet of paper P upside down, and then conveys the sheet of paper P to a position of the secondary transfer roller 14 again.

The paper feeding unit 17 stores a plurality of sheets of paper P on top of each other. A recording medium may be, but is not limited to, a sheet of paper P, such as a recording sheet (transfer sheet), and may be coated paper, cardboard, OHP (overhead project) sheet, plastic film, prepreg, copper foil, or any recording medium on which an image may be suitably formed (recorded).

With the electrophotographic image forming apparatus, the density characteristic of an image formed on a sheet of paper P may change due to changes in the ambient temperature or the ambient humidity, or changes in the characteristics of the photosensitive drums 12 over time. Therefore, with respect to the image forming apparatus 103, it is possible to adjust a bias voltage applied to the photosensitive drums 12 based on a detection signal of the toner concentration sensor 6 with respect to an image formed on the intermediate transfer belt 11.

The toner concentration sensor 6 is an optical sensor that emits light to an image formed on the intermediate transfer belt 11 and receives reflected light. The toner concentration sensor 6 detects a density of the image based on the light intensity of the reflected light.

In addition, the image forming apparatus 103 can detect "out of color registration" on the intermediate transfer belt 11 by detecting patterns of the respective colors formed on the intermediate transfer belt 11 using the toner concentration sensor 6 and correct the out of color registration.

In the image forming apparatus 103, the reading unit 307 is provided on a downstream side of the fixing roller 15 along the conveying direction of a sheet of paper P. The reading unit 307 includes the in-line sensor 400. The in-line sensor 400 includes a charge coupled device (CCD) 401 and a light source 402, for reading one side of a sheet of paper P and outputting corresponding read signals.

The CCD 401 is a line sensor in which pixels outputting electrical signals in accordance with the received light intensities are arranged in a form of a one-dimensional array. The array direction of the pixels intersects a conveying direction of a sheet of paper P. The in-line sensor 400 includes a pixel array for receiving red light (R), a pixel array for receiving green light (G), and a pixel array for receiving blue light (B).

The CCD 401 outputs electrical signals in accordance with the light intensities of reflected light from an image formed on a sheet of paper P as read signals. The pixel array of each color in the CCD 401 outputs read signals for each color. The in-line sensor 400 may include a complementary metal-oxide-semiconductor (CMOS), a photo diode (PD) array, or the like in place of a CCD.

The light source 402 irradiates a sheet of paper P to ensure brightness upon reading by the in-line sensor 400. The light source 402 has an array of light emitting diodes (LEDs) arranged along the array direction of pixels in the CCD 401 such that the LEDs irradiate a sheet of paper P with light having a linear cross sectional shape. The light source 402 may be configured to irradiate a sheet of paper P with light having a linear cross sectional shape through an optical element such as a rod lens. Instead of LEDs, fluorescent lamps or halogen lamps for emitting light having a linear cross sectional shape may be used.

In order to maintain color stability of an image, the image forming apparatus 103 can use the light intensity (density) of each color at a read image obtained by the in-line sensor 400 as color information to correct a printing color (image forming color) by the image forming unit 306.

Figure 5:
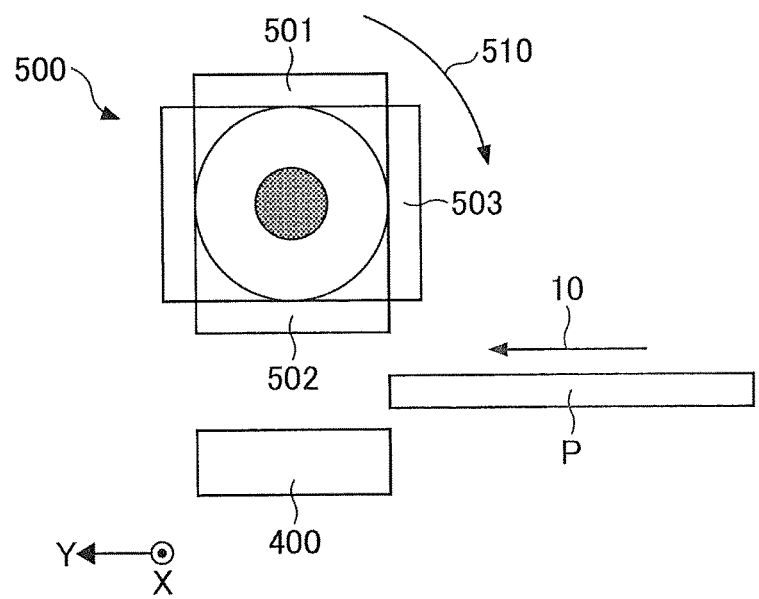
FIG. 5 is a diagram depicting an example of the structure of a background member.

The image forming apparatus 103 includes the background member 500 on an opposite side of a sheet of paper P with respect to the in-line sensor 400. FIG. 5 is a diagram depicting an example of the configuration of the background member 500. The background member 500 is a square column-shaped member having an axial direction (a longitudinal direction) corresponding to a X-axis direction intersecting a Y-axis of FIG. 5 along the conveying direction 10 of a sheet of paper P.

The image forming apparatus 103 includes the background member 500 positioned so that a sheet of paper P conveyed along the conveying direction 10 passes through between the background member 500 and the in-line sensor 400.

As depicted in FIG. 5, the background member 500 includes a white reference plate 501, a background plate 502, and a glass scale 503 on respective sides of the prism. The background member 500 is made of a resin, metal or the like, and the plate-shaped members, i.e., the white reference plate 501, the background plate 502, and the glass scale 503, are fixed to corresponding sides of the prism. As the background member 500 rotates along the direction of rotation 510 indicated by the arrow, a side facing the in-line sensor 400 is switched to another side.

The white reference plate 501 is white in color. The image forming apparatus 103 uses the white reference plate 501 for gain correction of the CCD 401 in the in-line sensor 400. Gains of the CCD 401 refer to amplification factors of read signals (electrical signals) output by the CCD 401 in accordance with the light intensities received. The white reference plate 501 may be made of a resin or the like.

In the gain correction, for example, a reference value for read signals to be obtained when the CCD 401 reads the white reference plate 501 is predetermined. The image forming apparatus 103 corrects the gains of the CCD 401 by adjusting the gain of each pixel of the CCD 401 so that a read signal of each pixel of the CCD 401 substantially becomes equal to the reference value.

The image forming apparatus 103 adjusts the light intensity of each LED of the light source 402 and performs shading correction for correcting unevenness of the light intensities of the emitted light of the light source 402, if any. In the shading correction, the image forming apparatus 103 adjusts the light intensity of each LED of the light source 402 so that read signals come to have values substantially equal to each other along the axial direction (the X-axis direction) of the background member 500.

In the in-line sensor 400, hues of a read image may change due to an increase in the temperature due to heat generated by the CCD 401 or the light source 402, resulting in a read error. The image forming apparatus 103 avoids an error of reading by performing gain correction on the CCD 401 or shading correction on the light source 402 using the white reference plate 501, before reading an image. The image forming apparatus 103 periodically corrects the gains and light intensity unevenness in order to avoid the occurrence of read errors resulting from increases in the temperature during continuous reading of an image formed on each of a plurality of sheets of paper P.

Because the white reference plate 501 is a reference for correction, it is desirable that the white reference plate 501 be free of dirt. Therefore, the image forming apparatus 103 sets the white reference plate 501 at a position facing the in-line sensor 400 only when correction is performed. The image forming apparatus 103 rotates the background member 500 for retracting the white reference plate 501 from the position facing the in-line sensor 400 for a time period (for example, when only feeding of a sheet of paper P is performed) other than the above-mentioned time period (i.e., when correction is performed).

The image forming apparatus 103 sets the background plate 502 at a position facing the in-line sensor 400 mainly when a sheet of paper P is passed between the background member 500 and the in-line sensor 400. The background plate 502 has a function to avoid fluttering or the like of a conveyed sheet of paper P. The material of the background plate 502 may be a resin or the like.

The image forming apparatus 103 detects an image misalignment generated on a sheet of paper P, feeds back the detected result to the image forming unit 306, and corrects the image misalignment so that an image on the sheet of paper P can pass through a predetermined position at a position of the reading unit 307 of FIG. 4. However, the CCD 401 of the in-line sensor 400 may become misaligned on a per pixel basis due to thermal expansion caused by the heat generated during reading, for example, when continuously reading a sheet of paper P being conveyed. When the CCD 401 is thus misaligned, a reading result of an image formed on a sheet of paper P is misaligned at a beginning of reading, and an error may occur in image misalignment correction.

Therefore, the image forming apparatus 103 corrects such a misalignment, if any, of the CCD 401 using the glass scale 503 of the background member 500. At a time of correction, the image forming apparatus 103 rotates the background member 500 to set the glass scale 503 at the position facing the in-line sensor 400.

Figure 6:
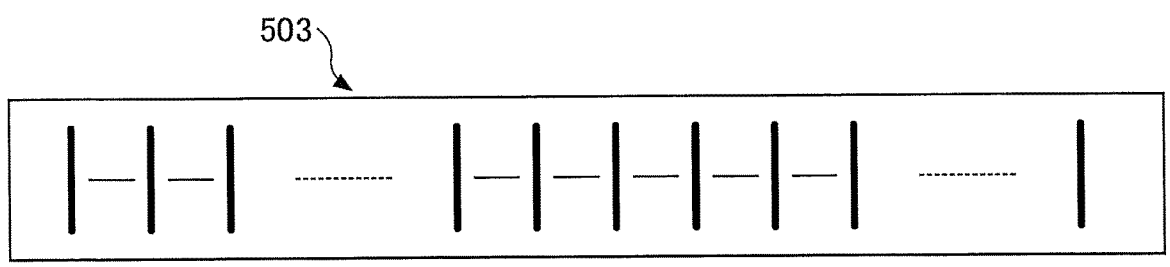
FIG. 6 is a diagram of an example of the structure of a glass scale.

FIG. 6 depicts an example of the configuration of the glass scale 503. The glass scale 503 is a member having a pattern of graduations formed at predetermined intervals in a glass with a low thermal expansion coefficient relative to the background member 500.

The image forming apparatus 103 can detect and correct a misalignment on a per pixel basis of the CCD 401 based on read signals obtained from the CCD 401 reading the glass scale 503.

<Functional Configuration of Control Unit 5>

Next, the functional configuration of the control unit 5 will be described with reference to FIG. 7. FIG. 7 is a block diagram depicting an example of the functional configuration of the control unit 5. As depicted in FIG. 7, the control unit 5 includes an image forming control unit 51, a reading control unit 52, and a correcting unit 53. The corresponding functions can be implemented by writing of a program stored in the ROM 302 of FIG. 3 to the RAM 303 and executing of the program while the RAM 303 is used as the working area by the CPU 301. FIG. 7 depicts only the main elements of the control unit 5 according to the present embodiments, but the control unit 5 may further include additional elements.

The image forming control unit 51 controls an image forming operation performed by the image forming unit 306 to form an image on a sheet of paper P. The reading control unit 52 also controls an operation of reading the image performed by the reading unit 307.

The correcting unit 53 performs a correction with respect to each of the image forming unit 306 and the reading unit 307. More specifically, in a correction with respect to the image forming unit 306, the correcting unit 53 corrects out of color registration with respect to image forming performed by the image forming unit 306 using the toner concentration sensor 6, without using a reading result of the reading unit 307.

More specifically, the correcting unit 53 corrects a position of the image for each color formed by the image forming unit 306 on the intermediate transfer belt 11 through the image forming control unit 51 based on a detection signal output by the toner concentration sensor 6 for each color formed by the image forming unit 306 on the intermediate transfer belt 11. Alternatively, the correcting unit 53 may also perform a correction with respect to the image forming unit 306 without using the image forming control unit 51.

In a correction with respect to the reading unit 307, the correcting unit 53 corrects an unevenness of gains of the CCD 401 and the light intensities of the light source 402 of the in-line sensor 400 by using the white reference plate 501. The glass scale 503 is used to correct a misalignment on a per pixel basis in the CCD 401 due to thermal expansion or the like. The correcting unit 53 performs a correction with respect to the reading unit 307 through the reading control unit 52, but may also perform a correction with respect to the reading unit 307 without using the reading control unit 52.

<Example of Operations of Image Forming Apparatus 103>

Figure 8A:
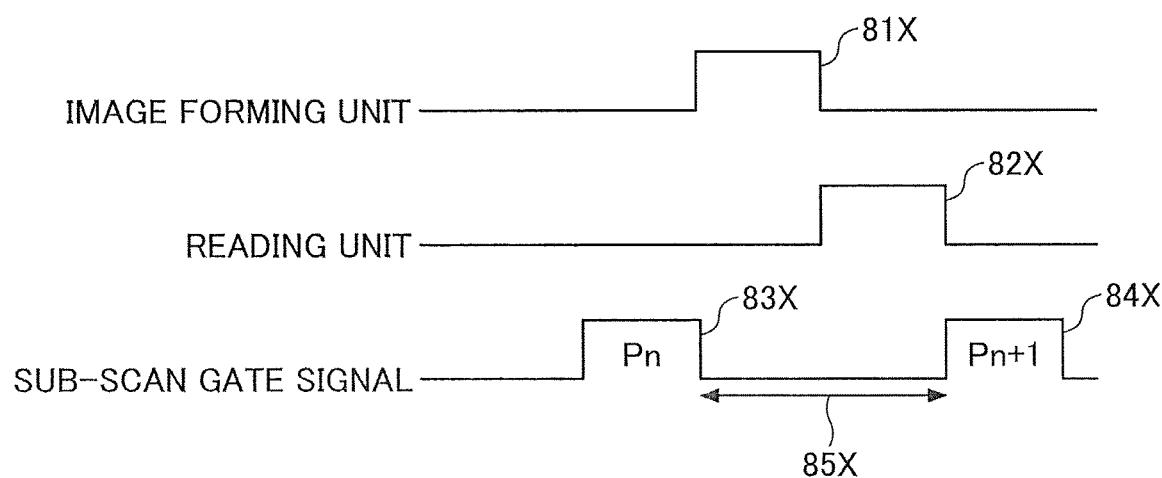
FIG. 8A is a timing chart of a comparative example of the operations of an image forming apparatus.
Figure 8B:
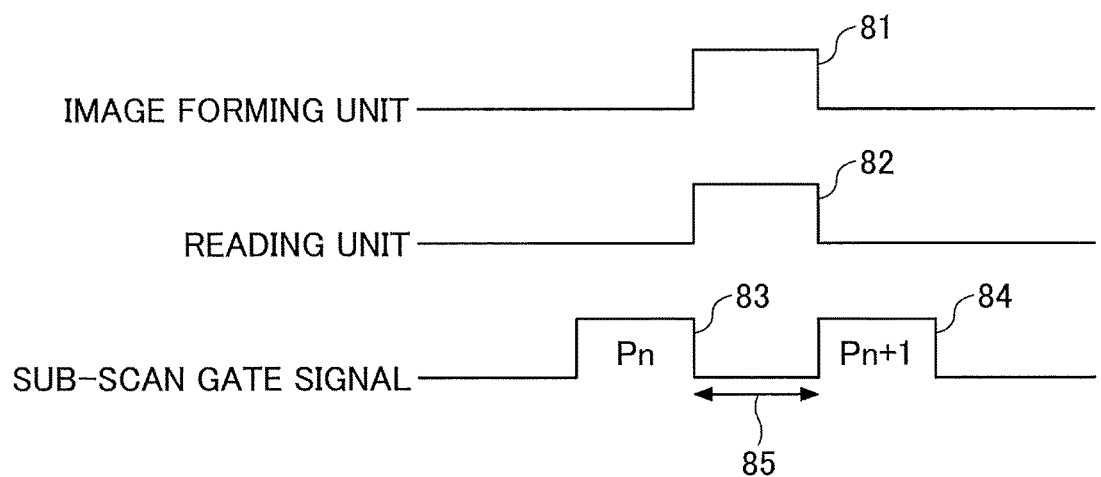
FIG. 8B is a timing chart of an example of the operations of the image forming apparatus according to the first embodiment.

Next, operations of the image forming apparatus 103 will be described with reference to FIGS. 8A, 8B, and 9. FIGS. 8A and 8B are timing charts for illustrating the correcting operations of the image forming apparatus 103. FIG. 8A depicts a correcting operation according to a comparative example, and FIG. 8B depicts a correcting operation according to the present embodiment. In each of FIGS. 8A and 8B, a correction time period with respect to the image forming unit 306, a correction time period with respect to the reading unit 307, and a sub-scan gate signal time period are depicted in the stated order from the top.

The sub-scan gate signal is a signal indicating an image forming time period with respect to a sheet of paper P. For example, in FIG. 8A, a sub-scan gate signal 83X represents an image forming time period with respect to a nth sheet of paper Pn, and a sub-scan gate signal 84X represents an image forming time period with respect to a (n+1)th sheet Pn+1. An inter-sheet time period 85X is a time period between the sub-scan gate signal 83X and the sub-scan gate signal 84X, no image being formed on a sheet of paper P during the time period. The inter-sheet time period 85X corresponds to a time period during which an area between the conveyed sheet of paper Pn and sheet of paper Pn+1 passes through the image forming position of the image forming unit 306.

In FIG. 8A, an image forming correction time period 81X, which is a correction period with respect to the image forming unit 306, and a reading correction time period 82X, which is a correction time period with respect to the reading unit 307, are non-concurrent. These time periods are included in the inter-sheet time period 85X where an image cannot be formed on a sheet of paper P. The term "non-concurrent" means "not concurrent". More specifically, the correction time period with respect to the reading unit 307 is shifted with respect to, i.e., is before or after the correction time period with respect to the image forming unit 306. The non-concurrent state is not limited to the depicted state where the correction time period with respect to the image forming unit 306 does not overlap with the correction time period with respect to the reading unit 307 at all. A non-concurrent state may be a state where a part of the correction time period with respect to the reading unit 307 does not overlap with, before or after, the correction time period with respect to the image forming unit 306, and either the correction time period with respect to the reading unit 307 or the correction time period with respect to the image forming unit 306 is not completely included in the other time period.

In FIG. 8B, an image forming correction time period 81, which is a correction time period with respect to the image forming unit 306, and a reading correction time period 82, which is a correction time period with respect to the reading unit 307, are concurrent. The term "concurrent" means "concurrently occurring". However, the present invention is not limited to the depicted state where the correction time period with respect to the image forming unit 306 coincides with the correction time period with respect to the reading unit 307. In one embodiment, even in a case where either the correction time period with respect to the image forming unit 306 or the correction time period with respect to the reading unit 307 is completely included in the other time period, these correction time periods can be said to be concurrent.

Because the image forming correction time period 81 and the reading correction time period 82 are thus concurrent, the inter-sheet time period 85 is shorter in comparison to the inter-sheet time period 85X. In other words, in the present embodiment, a correction with respect to the image forming unit 306 and a correction with respect to the reading unit 307 are concurrently performed, and the inter-sheet time period 85 is shortened in comparison with the comparative example. As a result of shortening the time period, during which an image is not formed on a sheet of paper P, the productivity of the image forming apparatus 103 is improved.

FIG. 9 is a flowchart depicting an example of the operations of the image forming apparatus 103. FIG. 9 depicts the operations of the image forming apparatus 103 upon being triggered by an event, such as receiving a print job in the image forming system 100. See also the configuration diagram FIG. 4 if necessary.

After receiving a print job in step S91, the image forming apparatus 103 starts an image forming operation.

In step S92, the image forming apparatus 103 determines whether the image forming operation with respect to the print job has ended.

If it is determined in step S92 that the image forming operation has ended (Yes in step S92), the process ends. If it is determined in step S92 that the image forming operation has not ended (No in step S92), the image forming apparatus 103 determines in step S93 whether to perform a correction with respect to the image forming unit 306.

If it is determined in step S93 that the correction is to be performed (Yes in step S93), the image forming apparatus 103 concurrently performs the correction with respect to the image forming unit 306 and a correction with respect to the reading unit 307 in step S94. Thereafter, the image forming apparatus 103 performs operations of step S91 and subsequent steps again. If it is determined in step S93 that the correction is not to be performed (No in step S93), the image forming apparatus 103 performs operations of step S91 and subsequent steps again.

The image forming apparatus 103 can perform the correction with respect to the image forming unit 306 and the correction with respect to the reading unit 307 in the manner as described above. When a correction frequency with respect to the image forming unit 306 is greater than a correction frequency with respect to the reading unit 307, the performance of the reading unit 307 does not deteriorate although timings of corrections with respect to the image forming unit 306 and the reading unit 307 are made to be concurrent.

<Advantageous Effect of Image Forming Apparatus 103>

An advantageous effect of the image forming apparatus 103 will now be described.

In the image forming apparatus, when the image forming apparatus temporarily stops an image forming operation in order to perform a correction with respect to the reading unit during execution of a print job, the productivity of the image forming apparatus may be decreased. Particularly, in a case where the image forming apparatus performs commercial printing for which high productivity is required, such a decrease in the productivity may cause a significant adverse effect.

In order to solve the problem, in a known comparative example, the timing of a correction with respect to an image forming unit is made earlier so that one time of a correction with respect to a reading unit is performed for a plural corrections with respect to the image forming unit, in a case where the correction with respect to the image forming unit is performed after a correction with respect to the reading unit and before another correction with respect to the reading unit. Thereby it is possible to reduce the number of times of corrections with respect to the reading unit and avoid a decrease in the productivity.

In the comparative example, the correction timing with respect to the image forming unit is thus performed earlier. However, only the correction with respect to the reading unit is non-concurrently performed with the correction with respect to the image forming unit. Therefore, in the comparative example, it may be impossible to sufficiently improve the productivity.

The image forming apparatus (i.e., an information processing apparatus) according to the present embodiment forms an image on a sheet of paper (a recording medium), and includes an image forming unit (first information processing unit) for forming an image on the recording medium, a reading unit (second processing unit) for reading the image formed by the image forming unit, and a control unit for controlling each of the image forming unit and the reading unit. The control unit includes a correcting unit for correcting each of the plurality of processing units, and the correcting unit concurrently performs respective corrections with respect to the plurality of processing units. As the corrections with respect to the plurality of processing units are thus concurrently performed, the time required for the corrections is shorter in comparison to a case where the corrections are non-concurrently performed, and a time period during which no image is formed on a sheet paper is shortened. Therefore, it is possible to improve the productivity of the image forming apparatus.

In the present embodiment, the correcting unit performs a correction with respect to a predetermined processing unit without using information obtained by a processing unit other than the predetermined processing unit from among the plurality of processing units. For example, from among an image forming unit and a reading unit (i.e., the plurality of processing units), a correction with respect to the image forming unit (a predetermined processing unit) is performed with the use of the toner concentration sensor without using a read signal obtained by the reading unit (a processing unit other than the predetermined processing unit). Therefore, because a wait time until the reading unit obtains the read signal can be eliminated, the correction time period can be shortened, and the productivity of the image forming apparatus can be improved.

In the above-described embodiment, a correction performed during a time period during which an image forming operation in response to a print job is performed has been described. However, a feature of the embodiment can be applied also for when a correction is performed after receiving a print job and before a corresponding image forming operation is performed.

In other words, the image forming unit forms an image based on a print job, and the correcting unit can concurrently perform respective corrections with respect to the image forming unit and the reading unit before the image forming unit forms the image based on the print job, as will now be described.

Figure 10A:
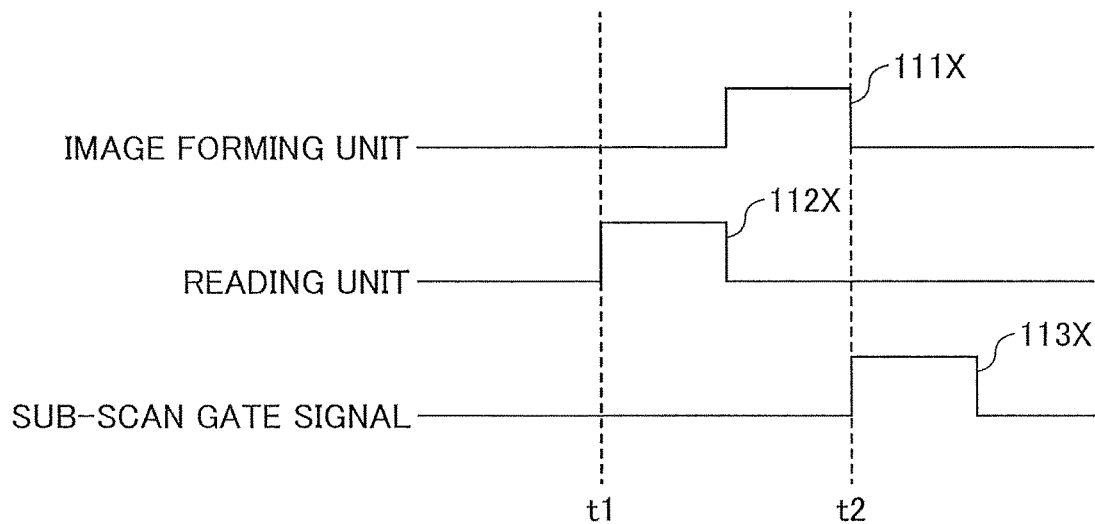
FIG. 10A is a timing chart of a comparative example of the operations of an image forming apparatus.
Figure 10B:
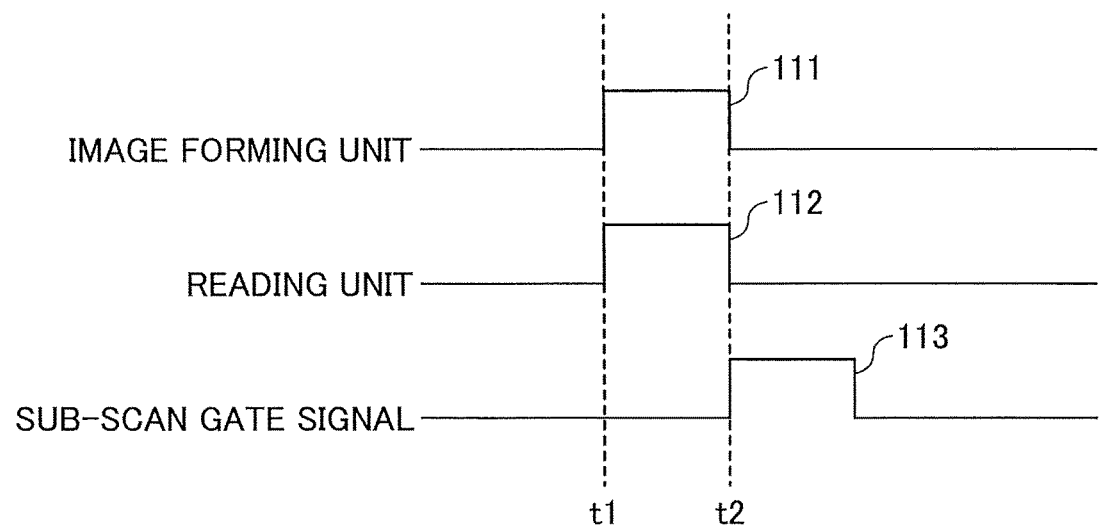
FIG. 10B is a timing chart of another example of the operations of the image forming apparatus according to the first embodiment.

FIGS. 10A and 10B are timing charts for illustrating another example of the operations of the image forming apparatus. FIG. 10A relates to a comparative example, and FIG. 10B relates to a variant of the above-described embodiment. Because FIGS. 10A and 10B are similar to FIGS. 8A and 8B, the overlapping description will be omitted. In FIGS. 10A and 10B, a timing t1 represents a timing to start power supply to the image forming apparatus, and a timing t2 represents a timing to start a print job.

In FIG. 10A, after a print job is received, respective corrections with respect to the image forming unit and the reading unit are performed before a sub-scan gate signal 113X for performing an image forming operation corresponding to the print job. However, a time period of an image forming correction time period 111X, which is a correction time period with respect to the image forming unit, and a reading correction time period 112X, which is a correction time period with respect to the reading unit, are not concurrent.

In contrast to FIG. 10A, in FIG. 10B, an image forming correction time period 111 and a reading correction time period 112 are concurrent. Therefore, it is possible to shorten a time from when power supply to the image forming apparatus is turned on to a time when a first page is printed, and thus the productivity of the image forming apparatus can be improved.

Second Embodiment

Next, the image forming apparatus 103a according to a second embodiment will be described. The same reference numerals are given to the same components as the components described above with respect to the first embodiment, and the overlapping description is appropriately omitted. This manner will also be applied to the other embodiments that will be described later.

According to the present embodiment, by determining the type of a correction to be performed with respect to the reading unit in accordance with the time required for a correction with respect to the image forming unit, one of the time required for the correction with respect to the image forming unit and the time required for the correction with respect to the reading unit is prevented from becoming longer than the other. Accordingly, idle time in which, for example, either the correction with respect to the image forming unit or the correction with respect to the reading unit ends earlier and only the other correction continues can be minimized, and a decrease in the productivity of the image forming apparatus is reduced.

Figure 11:
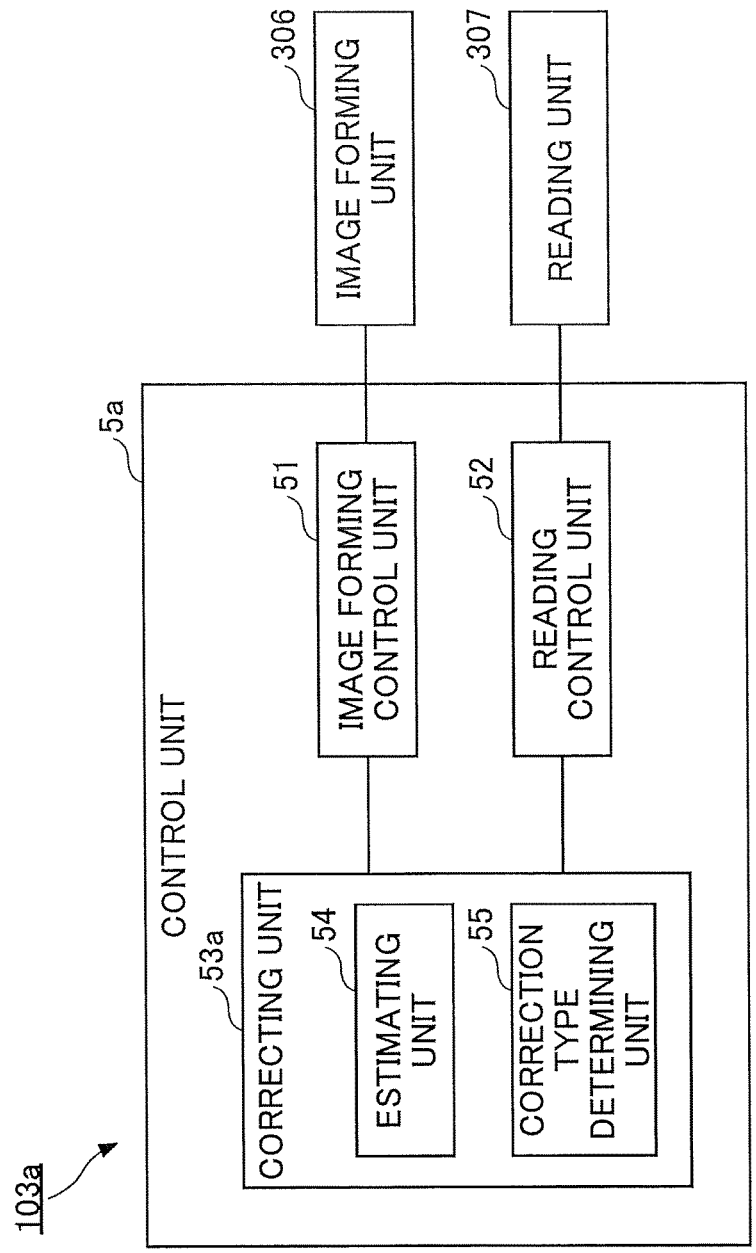
FIG. 11 is a block diagram depicting the functional configuration of an image forming apparatus according to a second embodiment.

The image forming apparatus 103a may have the same configuration as the configuration depicted in FIG. 4. FIG. 11 is a block diagram explaining an example of the functional configuration of the control unit 5a of the image forming apparatus 103a. As depicted in FIG. 11, the control unit 5a includes the correcting unit 53a. The correcting unit 53a includes an estimating unit 54 and a correction type determining unit 55.

The estimating unit 54 estimates the time required for a correction with respect to the image forming unit 306 and provides the estimated result to the correction type determining unit 55. For example, the estimation may be performed by referring to a table or the like in which the number of colors with respect to a correction with respect to the image forming unit 306 or the size of a pattern formed with respect to a correction with respect to the image forming unit 306 is associated with a required time for the correction with respect to the image forming unit 306.

The correction type determining unit 55 determines the type of correction with respect to the reading unit 307 in accordance with the information of the required time obtained from the estimating unit 54. The type of correction may be a gain correction with respect to the CCD 401 (see FIG. 4), a correction of light intensity unevenness of the light source 402, a correction of misalignment due to thermal expansion of the CCD 401, or the like.

For example, when the time required for a correction with respect to the image forming unit 306 is long, all of the three corrections of the gain correction, the light intensity unevenness correction, and the misalignment correction are performed as a correction with respect to the reading unit 307 because there is the sufficient time.

When the time required for a correction with respect to the image forming unit 306 is short, all of the three corrections are not performed as a correction with respect to the reading unit 307, and instead, just one or two corrections from among the three corrections are performed depending on the time required for the correction with respect to the image forming unit 306.

Thus, the difference between a correction time period with respect to the image forming unit and a correction time period with respect to the reading unit can be reduced.

Figure 12:
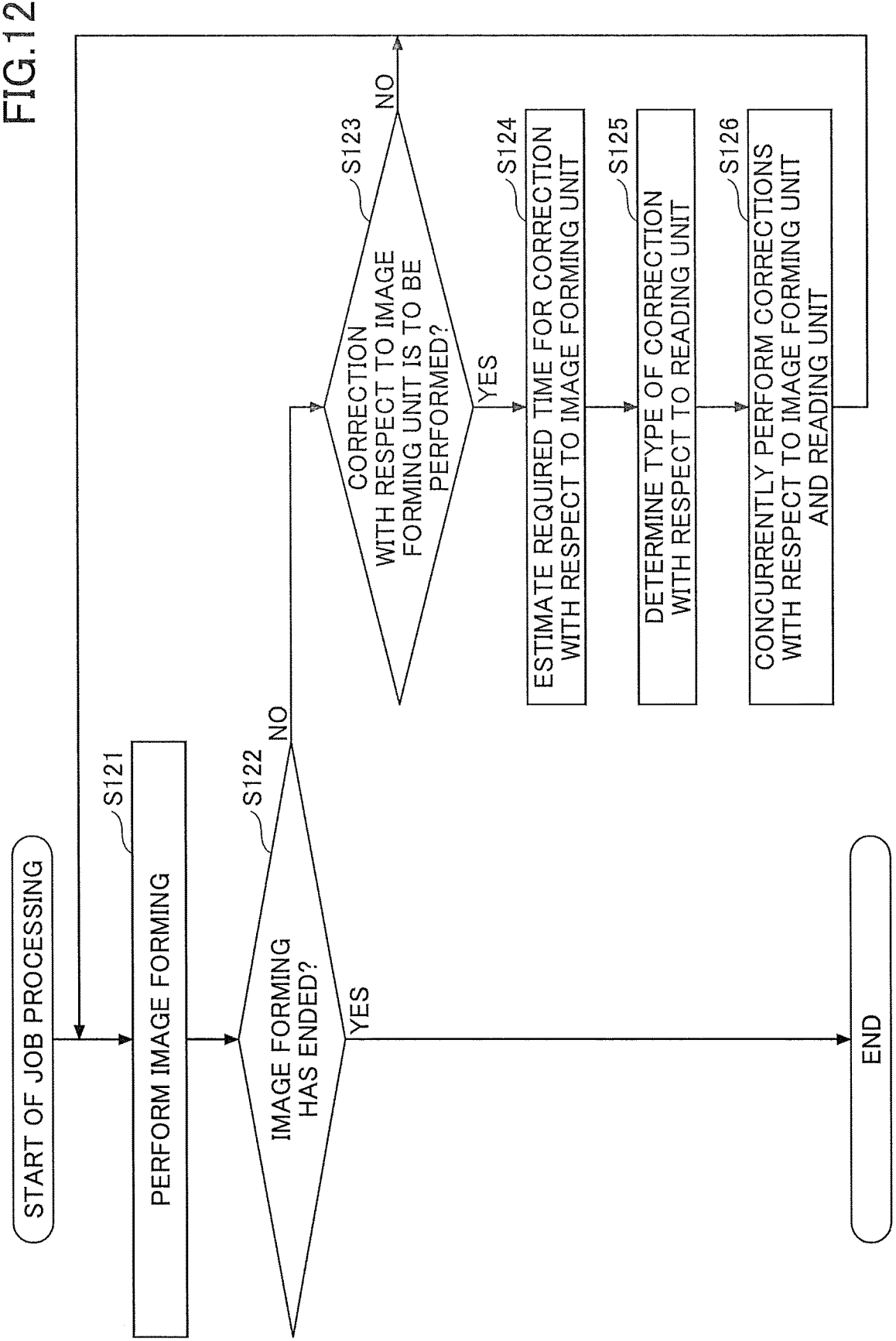
FIG. 12 is a flow diagram depicting an operation example of the image forming apparatus according to the second embodiment.

Next, FIG. 12 is a flowchart depicting an example of the operations of the image forming apparatus 103a. Similar to FIG. 9, FIG. 12 depicts operations of the image forming apparatus 103a upon being triggered by an event, such as receiving a print job.

Steps S121 to S123 and S126 in FIG. 12 are the same as steps S91 to S93 and S94 in FIG. 9, respectively. Therefore, the overlapping description will not be repeated here. See also the functional configuration diagram FIG. 11 if necessary.

In step S124, the estimating unit 54 estimates the time required to perform the correction with respect to the image forming unit 306 and provides the estimated result to the correction type determining unit 55.

Subsequently, in step S125, the correction type determining unit 55 determines the type of correction with respect to the reading unit 307 in accordance with the information of the required time obtained from the estimating unit 54. Thereafter, in step S126, the correcting unit 53a concurrently performs the correction with respect to the image forming unit 306 and the correction with respect to the reading unit 307. Thereafter, the image forming apparatus 103a performs operations of step S121 and subsequent steps again.

The image forming apparatus 103a can perform the correction with respect to the image forming unit 306 and the correction with respect to the reading unit 307 in the manner as described above.

<Advantageous Effect of Image Forming Apparatus 103a>

When a correction with respect to the image forming unit and a correction with respect to the reading unit are concurrently performed by making the respective timings concurrent, required times may differ significantly between these corrections even if the timings of performing the corrections are coincident.

According to the present embodiment, by determining the type of correction with respect to the reading unit in accordance with the time required for a correction with respect to the image forming unit, it is possible to avoid having the time needed to perform one of the correction with respect the image forming unit and the correction with respect the reading unit be much longer than the time needed to perform the other, and the difference between the lengths of the times required for both the corrections can be reduced. Accordingly, it is possible to reduce or eliminate idle time, such as a wait time during which the correction with respect to either the image forming unit or the reading unit is not performed, and thus it is possible to minimize decreases in the productivity of the image forming apparatus.

Third Embodiment

Next, the image forming apparatus 103b according to a third embodiment will now be described.

According to the present embodiment, by determining before performing a correction with respect to the image forming unit whether it is necessary to perform a correction with respect to the reading unit, it is possible to avoid performing a correction with respect to the reading unit in a case where it is not necessary to perform the correction, and it is possible to reduce power consumption, resulting from, for example, turning on the light source in the reading unit, and so forth.

Figure 13:
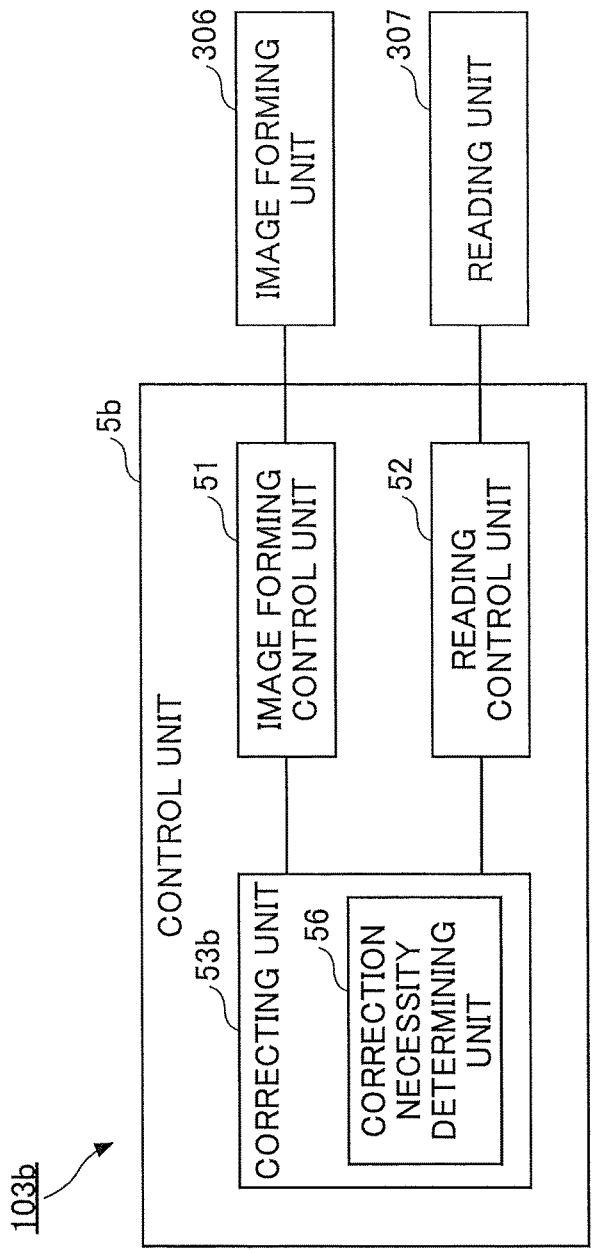
FIG. 13 is a block diagram depicting the functional configuration of an image forming apparatus according to a third embodiment.

The image forming apparatus 103b may have the same configuration as the configuration depicted in FIG. 4. FIG. 13 is a block diagram depicting an example of the functional configuration of the control unit 5b of the image forming apparatus 103b. As depicted in FIG. 13, the control unit 5b includes the correcting unit 53b. The correcting unit 53b includes a correction necessity determining unit 56.

The correction necessity determining unit 56 determines necessity of a correction with respect to the reading unit 307 at a time when it is determined that a correction with respect to the image forming unit 306 is to be performed. The determination by the correction necessity determining unit 56 can be made based on, for example, a time when a previous correction with respect to the reading unit 307 was performed or the number of times of image forming operations performed from a time when a previous correction with respect to the reading unit 307 was performed. If it is determined that a correction with respect to the reading unit 307 is not needed, a correction with respect to the reading unit 307 is not performed.

Figure 14:
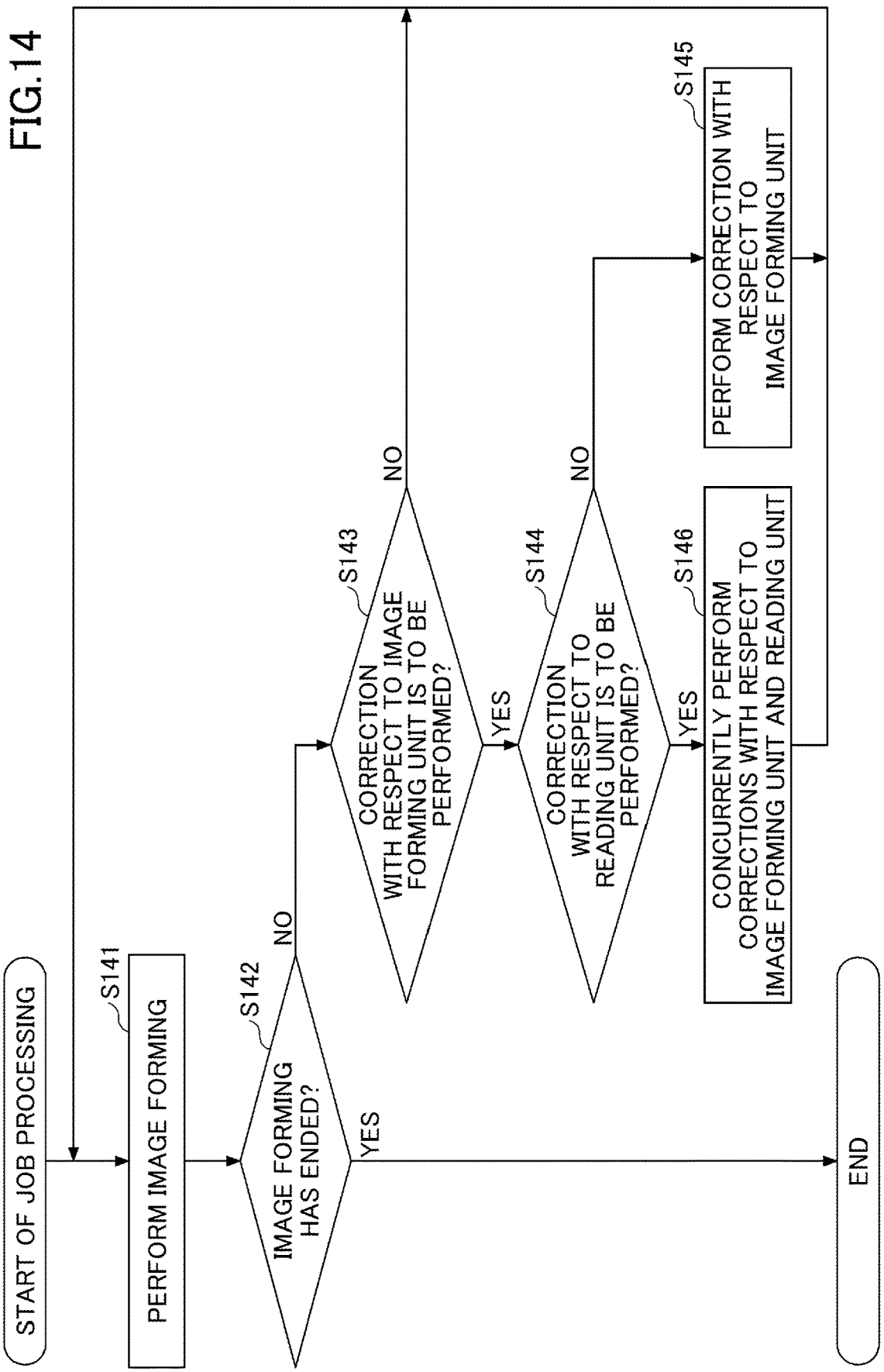
FIG. 14 is a flow diagram depicting an operation example of the image forming apparatus according to the third embodiment.

Next, FIG. 14 is a flowchart depicting an example of the operations of the image forming apparatus 103b. Similar to FIG. 9, FIG. 14 depicts operations of the image forming apparatus 103b upon being triggered by an event, such as receiving a print job. Steps S141-S143 and S146 in FIG. 14 are the same as steps S91-S93 and S94 in FIG. 9, respectively. Therefore, the overlapping description will not be repeated here. See also the functional configuration diagram of FIG. 13 if necessary.

In step S144, the correction necessity determining unit 56 determines necessity of a correction with respect to the reading unit 307, at a timing when it is determined that a correction with respect to the image forming unit 306 is to be performed.

If it is determined that there is no necessity of a correction with respect to the reading unit 307 in step S144 (No in step S144), the correcting unit 53b only performs a correction with respect to the image forming unit 306 in step S145. Thereafter, the image forming apparatus 103b performs operations of step S141 and subsequent steps again. If it is determined in step S144 that it is necessary to perform a correction with respect to the reading unit 307 (Yes in step S144), the correcting unit 53b concurrently performs the correction with respect to the image forming unit 306 and the correction with respect to the reading unit 307 in step S146. Thereafter, the image forming apparatus 103b performs operations of step S141 and subsequent steps again.

The image forming apparatus 103b can perform the correction with respect to the image forming unit 306 and the correction with respect to the reading unit 307 in the manner as described above.

<Advantageous Effect of Image Forming Apparatus 103a>

When performing a correction with respect to the reading unit, it is necessary to turn on the light source. Therefore, if a correction with respect to the reading unit were performed at a timing when it is not necessary to perform the correction with respect to the reading unit, there would be unnecessary power consumption due to turning on the light source, and the useful life of the light source would be shortened.

According to the present embodiment, by determining before performing a correction with respect to the image forming unit whether it is necessary to perform a correction with respect to the reading unit, the correction with respect to the reading unit is not performed when it is determined that it is not necessary perform the correction, and thus power consumption due to lighting of the light source in the reading unit can be reduced. In addition, it is possible to prolong the service life of components such as the light source.

Fourth Embodiment

Next, the image forming apparatus 103c according to a fourth embodiment will be described.

In the present embodiment, the reading unit includes a first reading unit for reading an image formed on a first side of a recording medium and a second reading unit for reading an image formed on a second side of the recording medium different from the first side, and the correcting unit concurrently performs corrections with respect to the image forming unit, the first reading unit, and the second reading unit.

The first side of the recording medium is, for example, the front side of the recording medium, and the second side of the recording medium is, for example, the back side of the recording medium. As described above, even in the image forming apparatus thus reading both sides of a recording medium, respective corrections with respect to the image forming unit, the first reading unit, and the second reading unit are concurrently performed to improve the productivity of the image forming apparatus.

Figure 15:
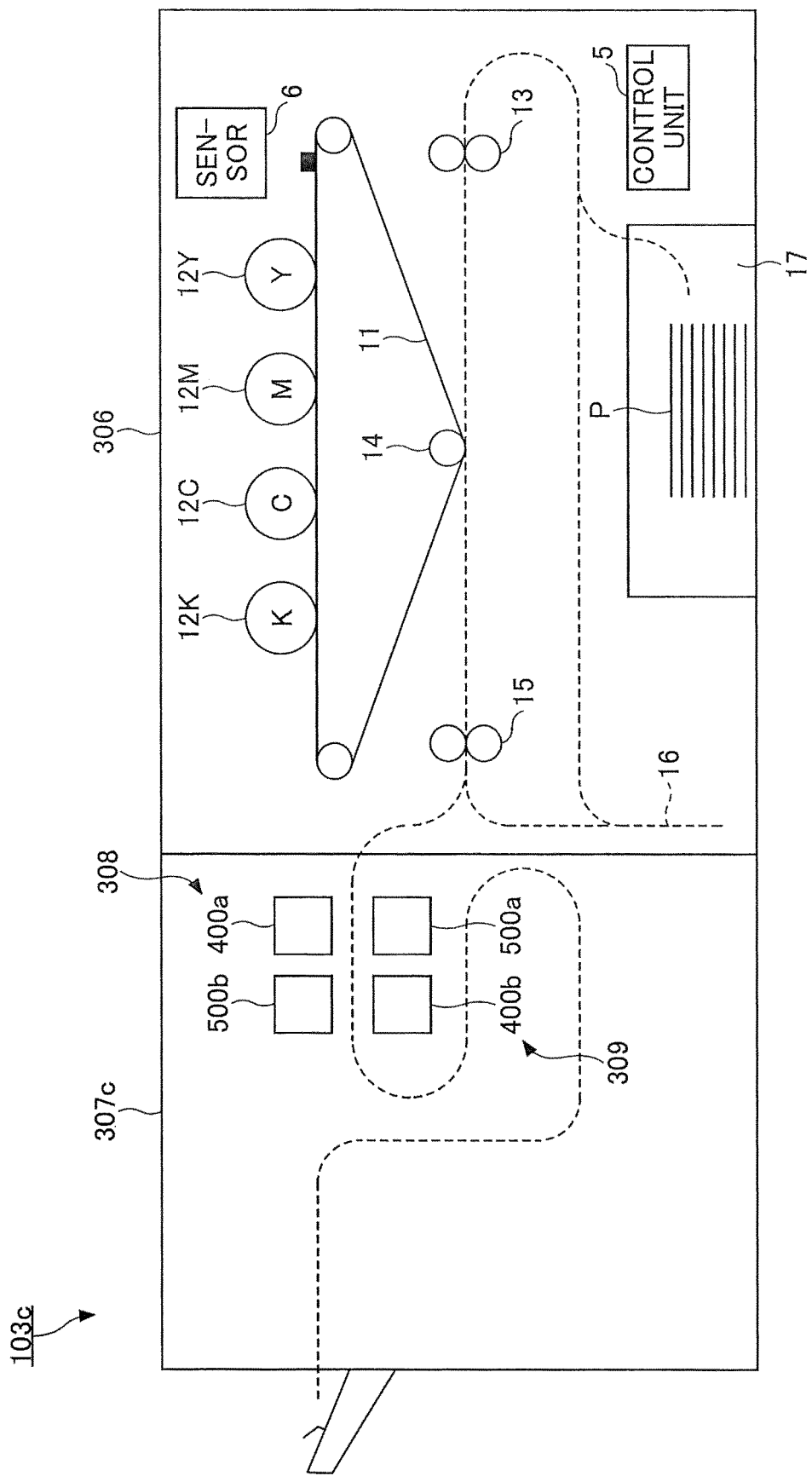
FIG. 15 is a diagram depicting an example configuration of an image forming apparatus according to a fourth embodiment.

FIG. 15 is a diagram depicting an example of the configuration of the image forming apparatus 100c. As depicted in FIG. 15, the image forming apparatus 100c includes the reading unit 307c. The reading unit 307c includes a front side reading unit 308 and a back side reading unit 309.

The front side reading unit 308 includes an in-line sensor 400a and a background member 500a, and reads the front side of a sheet of paper P conveyed through the conveying path 16. The front side of the sheet of paper P is an example of a first side of a recording medium, and the front side reading unit 308 is an example of a first reading unit.

The back side reading unit 309 includes an in-line sensor 400b and the background member 500b to read the back side of a sheet of paper P conveyed through the conveying path 16. The back side of the sheet of paper P is an example of a second side of a recording medium, and the back side reading unit 309 is an example of a second reading unit.

Figure 16:
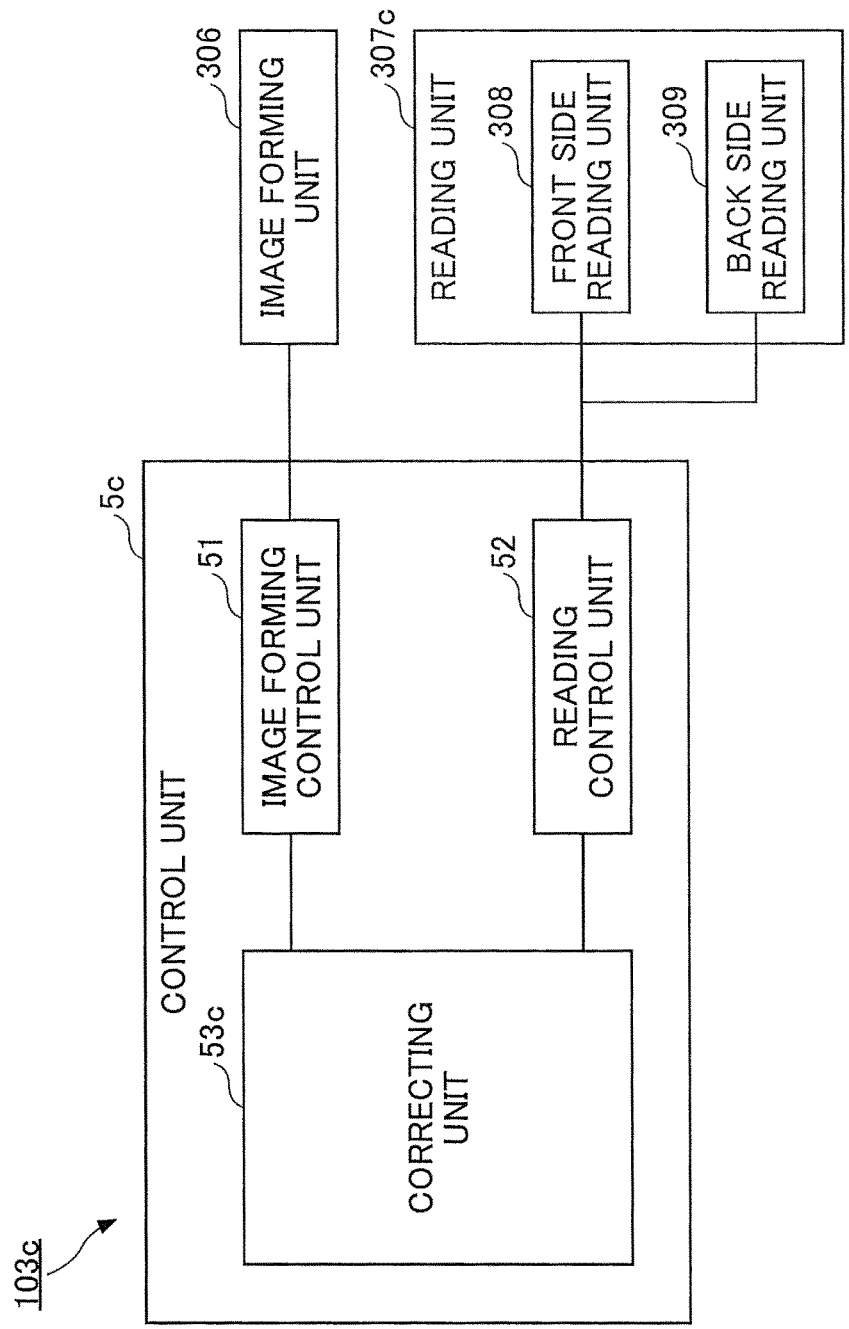
FIG. 16 is a block diagram depicting the functional configuration of the image forming apparatus according to the fourth embodiment.

FIG. 16 is a block diagram depicting an example of the functional configuration of the control unit 5c of the image forming apparatus 103c. As depicted in FIG. 16, the control unit 5c includes the correcting unit 53c. The correcting unit 53c can concurrently perform corrections with respect to the image forming unit 306, the front side reading unit 308, and the back side reading unit 309.

Figure 17A:
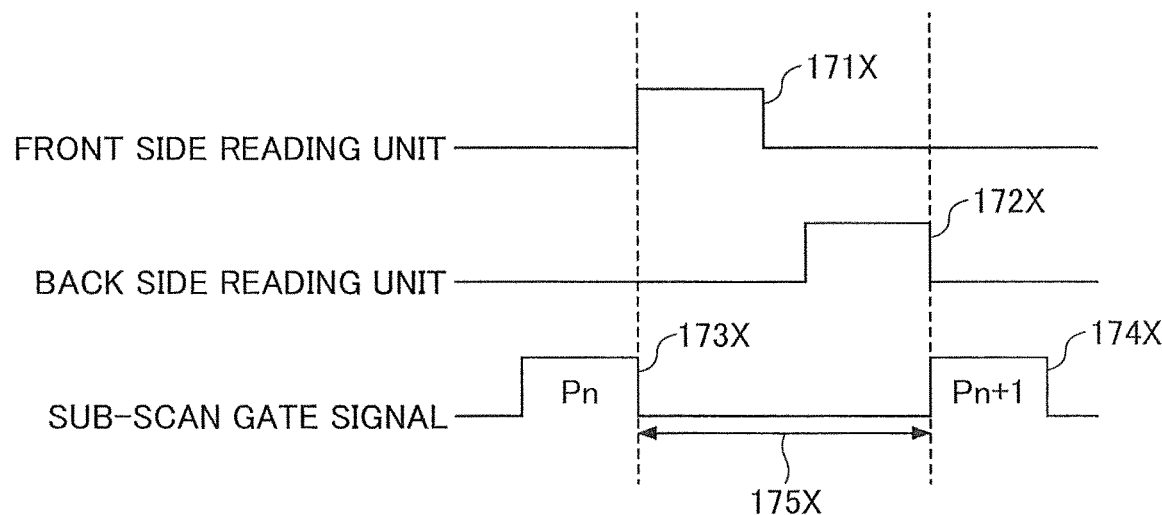
FIG. 17A is a timing chart of a comparative operation example of an image forming apparatus.
Figure 17B:
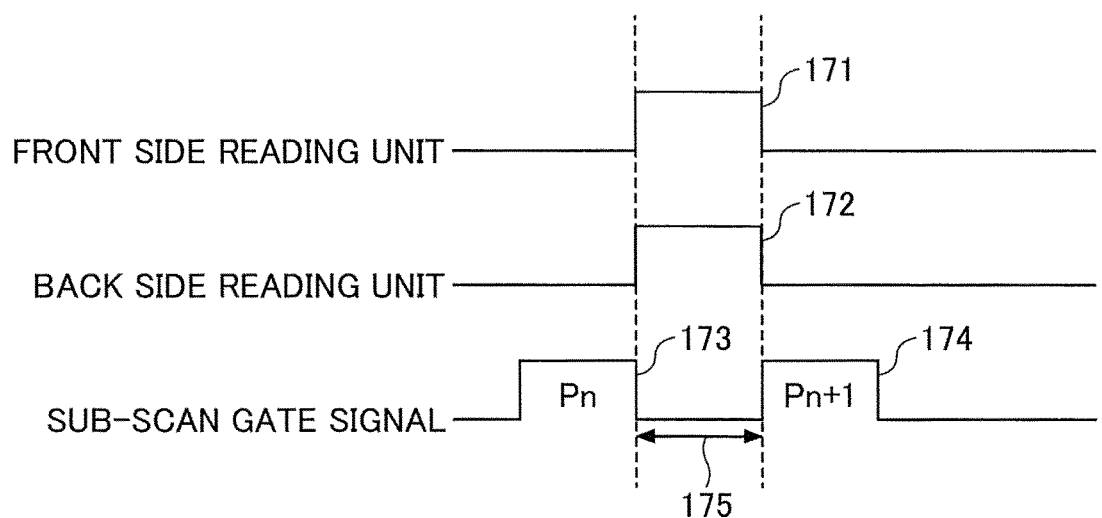
FIG. 17B is a timing chart of an operation example of the image forming apparatus according to the fourth embodiment.

FIGS. 17A and 17B are timing charts for illustrating an example of the operations of the image forming apparatus 103c. FIG. 17A depicts a comparative example, and 17B depicts the present embodiment. FIGS. 17A and 17B are similar to FIGS. 8A and 8B, but depict timings with respect to the front side reading unit, the back side reading unit, and the sub-scan gate signal.

In FIG. 17A, a front side reading correction time period 171X with respect to the front side reading unit and a back side reading correction time period 172X with respect to the back side reading unit are shifted from one another and thus are not concurrent with each other. In an inter-sheet time period 175X between a sub-scan gate signal 173X and a sub-scan gate signal 174X, an image is not allowed to be formed on a sheet of paper P.

In FIG. 17B, a front side reading correction time period 171 with respect to the front side reading unit and a back side reading correction time period 172 with respect to the back side reading unit are concurrent. As a result, an inter-sheet time period 175 between a sub-scan gate signal 173 and a sub-scan gate signal 174 is shortened in comparison to the inter-sheet time period 175X.

As described above, in the present embodiment, respective corrections with respect to the image forming unit, the first reading unit, and the second reading unit are concurrently performed, thereby shortening the time required for the corrections. Accordingly, it is possible to shorten a time period during which an image is not allowed to be formed on a sheet of paper, and thus the productivity of the image forming apparatus can be improved.

Fifth Embodiment

Although the above-described embodiments have been described using the image forming apparatuses as examples, an embodiment is not limited to an image forming apparatus, and it is possible to apply the present invention also to other information processing apparatuses including an image forming apparatus or an apparatus other than an image forming apparatus.

Figure 18:
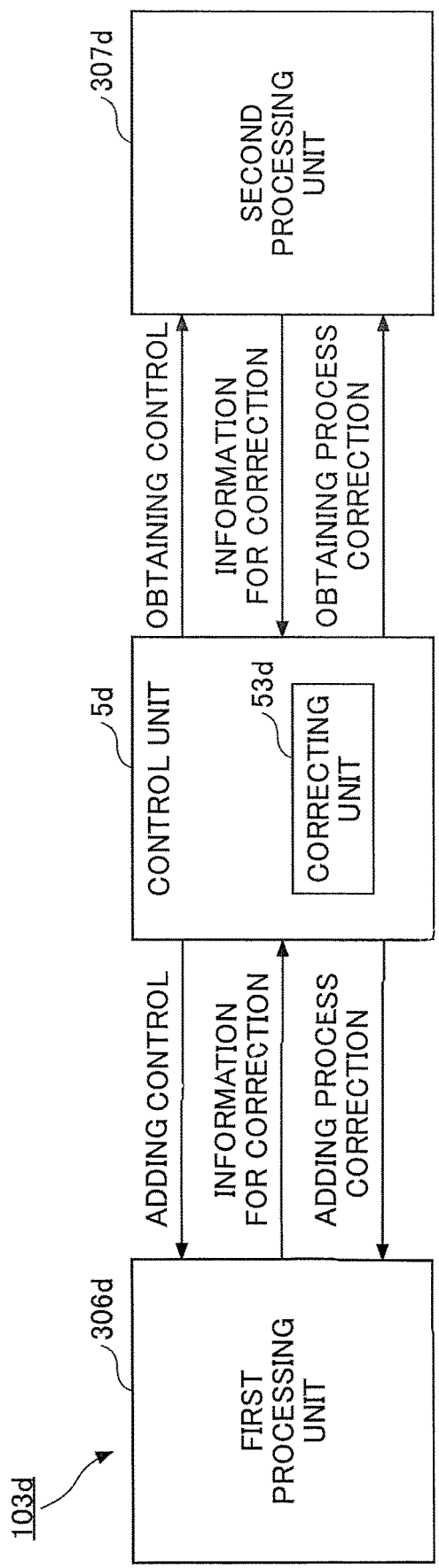
FIG. 18 is a block diagram depicting an example configuration of an information processing apparatus according to a fifth embodiment.

FIG. 18 is a block diagram depicting an example of the configuration of an information processing apparatus 103d according to a fifth embodiment. As depicted in FIG. 18, the information processing apparatus 103d includes the control unit 5d, the first processing unit 306d, and the second processing unit 307d.

The first processing unit 306d adds information to a target, and the second processing unit 307d obtains the information added to the target by the first processing unit 306d. The information processing apparatus 103d may include a processing unit that performs information processing in addition to the first processing unit 306d and the second processing unit 307d.

The control unit 5d controls each of a plurality of processing units including the first processing unit 306d and the second processing unit 307d. Specifically, the control unit 5d controls an information adding process of the first processing unit 306d and controls an information obtaining process of the second processing unit 307d.

The control unit 5d includes the correcting unit 53d. The correcting unit 53d performs respective corrections with respect to a plurality of processing units including the first processing unit 306d and the second processing unit 307d. Specifically, the correcting unit 53d performs a correction with respect to an information adding process of the first processing unit 306d, i.e., performs a correction with respect to the first processing unit 306d, based on information for correction obtained from the first processing unit 306d. The correcting unit 53d performs a correction with respect to an information obtaining process of the second processing unit 307d, i.e., performs a correction with respect to the second processing unit 307d, based on information for correction obtained from the second processing unit 307d.

FIG. 19 is a flowchart depicting a first example of the operations of the information processing apparatus 103d. See also the configuration diagram FIG. 18 if necessary.

First, in step S191, the information processing apparatus 103d performs predetermined information processing. This predetermined information processing is processing performed by one or more of the plurality of processing units.

Subsequently, in step S192, the information processing apparatus 103d determines whether the predetermined information processing has ended.

If it is determined in step S192 that the predetermined information processing has ended (Yes in step S192), the information processing apparatus 103d ends the process. If it is determined in step S192 that the predetermined information processing has not ended (No in step S192), the information processing apparatus 103d determines in step S193 whether it is necessary to perform corrections with respect to the plurality of processing units.

If it is determined in step S193 that it is not necessary to perform corrections with respect to the plurality of processing units (No in step S193), the information processing apparatus 103d performs operations of step S191 and subsequent steps again. If it is determined in step S193 that it is necessary to perform corrections with respect to the plurality of processing units (Yes in step S193), the information processing apparatus 103d obtains in step S194 information for corrections to be used in corrections with respect to the plurality of processing units.

Subsequently, in step S195, the information processing apparatus 103d concurrently performs respective corrections with respect to the plurality of processing units. Thereafter, the information processing apparatus 103d performs operations of step S191 and subsequent steps again.

The information processing apparatus 103d can perform corrections with respect to the plurality of processing units in the manner as described above.

Figure 20A:
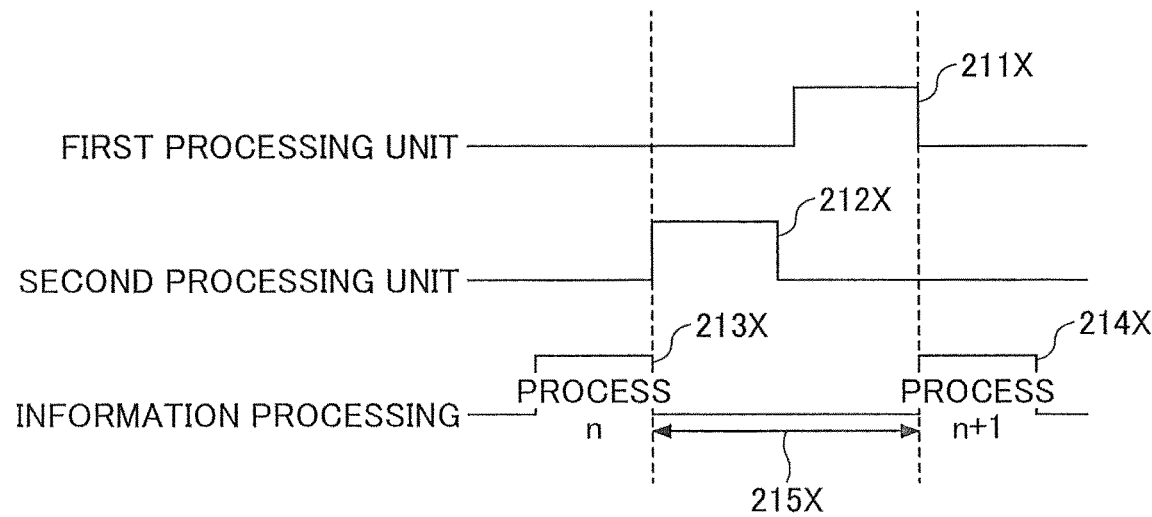
FIG. 20A is a timing chart of a comparative example of the operations of an information processing apparatus.
Figure 20B:
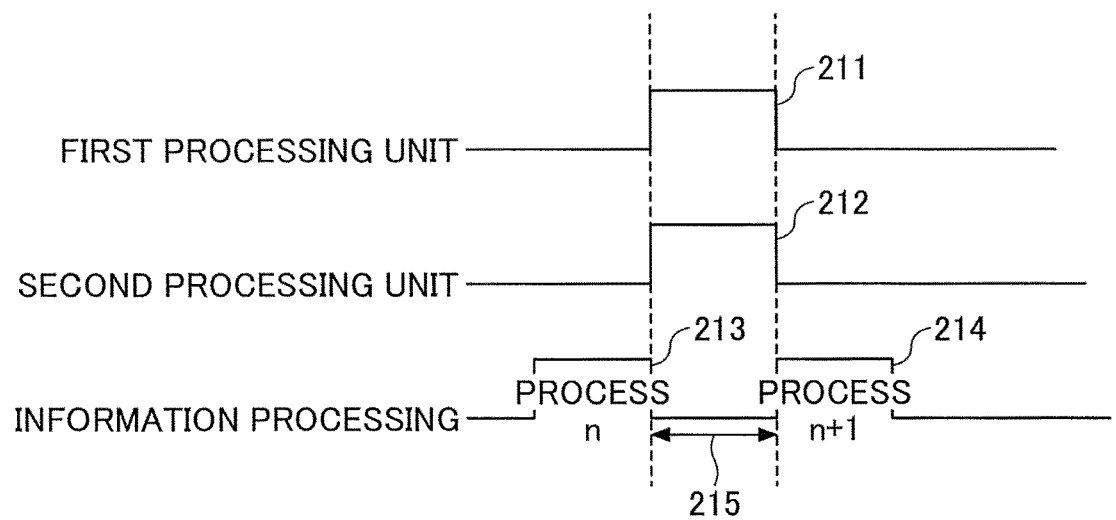
FIG. 20B is a timing chart of the first example of the operations of the information processing apparatus according to the fifth embodiment.

Next, FIGS. 20A and 20B are timing charts for illustrating a first example of a correcting operation of the information processing apparatus 103d. FIG. 20A depicts a correcting operation according to a comparative example, and FIG. 20B depicts a correcting operation according to the present embodiment. Each of FIG. 20A and FIG. 20B depicts a correction time period with respect to the first processing unit 306d, a correction time period with respect to the second processing unit 307d, and information processing time periods, in the stated order from the top.

The information processing time periods refer to time periods during which information processing is performed on a target. For example, in FIG. 20A, an information processing time period 213X represents an information processing time period with respect to a nth target, and an information processing time period 214X represents an information processing time period with respect to a (n+1)th target. A wait time 215X is a time period between the information processing time period 213X and the information processing time period 214X, and is a time period during which information processing is not allowed to be performed on a target.

In FIG. 20A, an information adding correction time period 211X, which is a correction time period with respect to the first processing unit 306d, and an information obtaining correction time period 212X, which is a correction time period with respect to the second processing unit 307d, are not concurrent. These time periods act as a wait time 215X during which information processing is not allowed to be performed on a target.

In FIG. 20B, an information adding correction time period 211, which is a correction time period with respect to the first processing unit 306d, and an information obtaining correction time period 212, which is a correction time period with respect to the second processing unit 307d, are concurrent.

Because the information adding correction time period 211 and the information obtaining correction time period 212 are thus concurrent, a wait time 215 is shorter in comparison to the wait time 215X. In other words, according to the present embodiment, the wait time 215 can be reduced relative to the comparison example, by concurrently performing corrections with respect to the first processing unit 306d and the correction of the second processing unit 307d. As a result of thus shortening the time period during which information processing is not performed on a target, the productivity of the information processing apparatus 103d can be improved.

Next, FIG. 21 is a flowchart depicting a second example of the operations of the information processing apparatus 103d. Because step S211 and step S212 in FIG. 21 are the same as step S191 and step S192 in FIG. 19, the overlapping description will not be repeated here. See also the configuration diagram of FIG. 18 if necessary.

In step S213, the information processing apparatus 103d determines whether a correction with respect to the second processing unit is necessary.

If it is determined in step S213 that it is not necessary to perform a correction with respect to the second processing unit (step S213 and No), the information processing apparatus 103d performs operations of step S211 and subsequent steps again. If it is determined in step S213 that a correction with respect to the second processing unit is necessary (Yes in step S213), the information processing apparatus 103d obtains, in step S214, information for corrections to be used in respective corrections with respect to the first processing unit 306d and the second processing unit 307d.

Subsequently, in step S215, the information processing apparatus 103d determines whether the respective corrections with respect to the first processing unit 306d and the second processing unit 307d are to be performed independently.

If it is determined in step S215 that the respective corrections with respect to the first processing unit 306d and the second processing unit 307d are to be performed not independently (No in step S215), the information processing apparatus 103d in step S216 non-concurrently performs the corrections with respect to the first processing unit 306d and the second processing unit 307d. Thereafter, the information processing apparatus 103d performs operations of step S211 and subsequent steps again.

If it is determined in step S215 that the respective corrections with respect to the first processing unit 306d and the second processing unit 307d are to be performed independently (Yes in step S215), the information processing apparatus 103d in step S217 concurrently performs the corrections with respect to the first processing unit 306d and the second processing unit 307d. Thereafter, the information processing apparatus 103d performs operations of step S211 and subsequent steps again.

The information processing apparatus 103d can perform corrections with respect to the first processing unit 306d and the second processing unit 307d in the manner as described above.

If a non-independent correction such as a color correction and an independent correction such as a shading correction are to be performed at the same timing, the shading correction is to be performed first for the color correction, and thus, the color correction and the shading correction cannot be concurrently performed. By determining whether corrections are performed independently in step S215 beforehand, it is possible to distinguish between a case where the corrections can be performed independently and a case where the corrections cannot be performed independently, and thus, it is possible to reduce a wait time of a user appropriately.

Note that a non-independent correction such as a color correction refers to the type of correction that cannot be performed independently or solely, i.e., the type of correction that can be performed in conjunction with another type of a correction such as a shading correction, whereas an independent correction such as a shading correction refers to the type of correction that can be performed independently or solely without needing any other correction to be performed in conjunction with the type of correction.

Figure 22A:
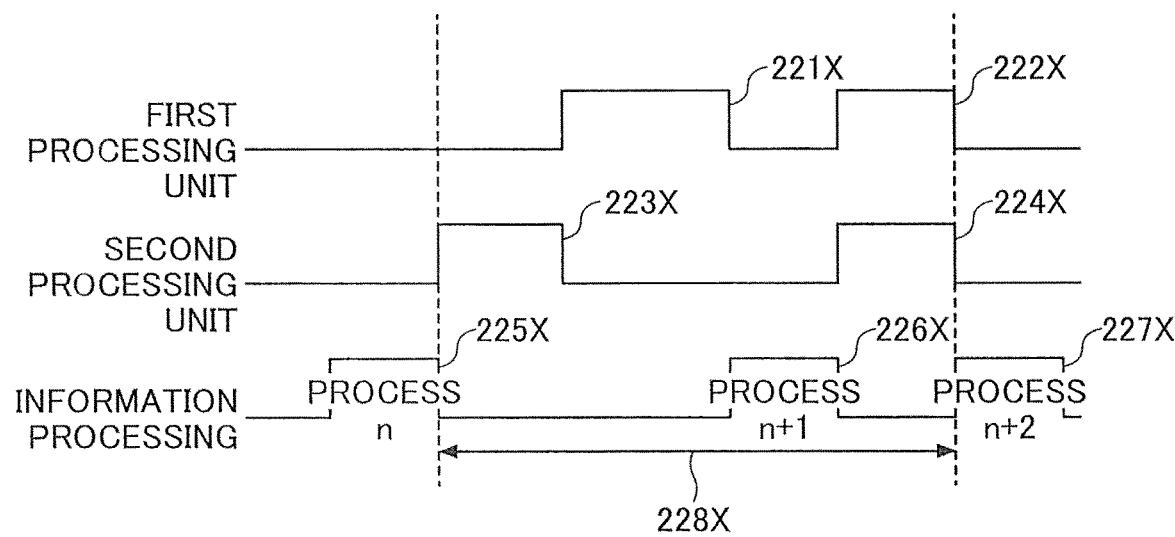
FIG. 22A is a timing chart of a comparative example of the operations of an information processing apparatus.
Figure 22B:
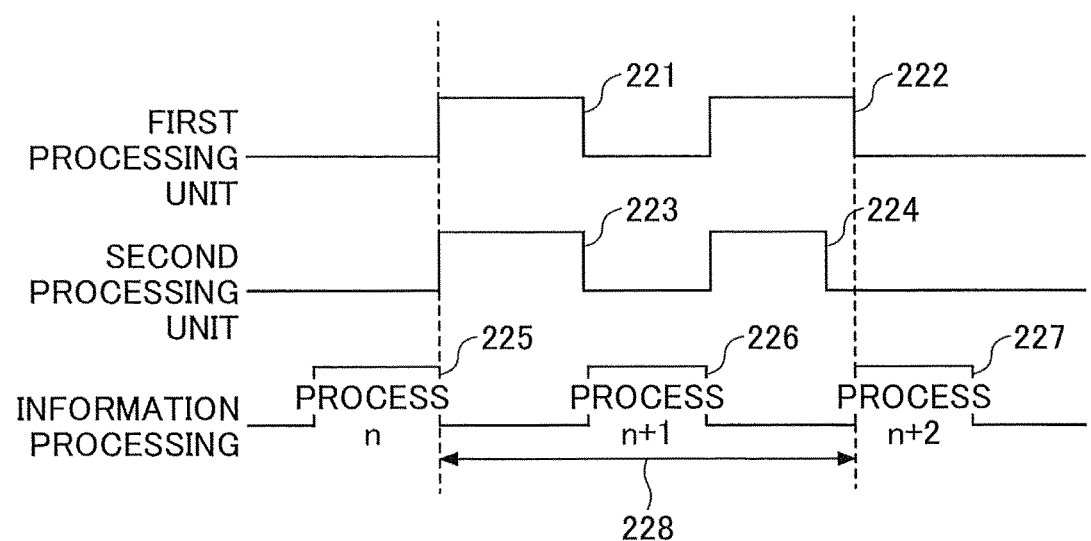
FIG. 22B is a timing chart of the second example of the operations of the information processing apparatus according to the fifth embodiment.

Next, FIGS. 22A and 22B are timing charts for illustrating a second example of the operations of the information processing apparatus according to the fifth embodiment. FIG. 22A depicts a comparative example, and FIG. 22B depicts the fifth embodiment. Because FIG. 22 is similar to FIG. 20, the overlapping description will not be repeated.

In FIG. 22A, a non-independent adding correction time period 221X and an independent adding correction time period 222X included in a correction time period with respect to the first processing unit 306d are depicted. An independent obtaining correction time period 223X and an independent obtaining correction time period 224X included in a correction time period with respect to the second processing unit 307d are depicted.

The non-independent adding correction time period 221X and the independent obtaining correction time period 223X are non-concurrent, thus increasing the wait time 228X.

In FIG. 20B, an independent adding correction time period 221 that is independent and a non-independent adding correction time period 222 that is not independent, these time periods 221 and 222 being included in a correction time period with respect to the first processing unit 306d, are depicted. Also an independent obtaining correction time period 223 that is independent and an independent obtaining correction time period 224 that is independent, these time periods 223 and 224 being included in a correction time period with respect to the second processing unit 307d, are depicted.

Because the non-independent adding correction time period 222 and the independent obtaining correction time period 224 are concurrent, the wait time 228 is shorter than the wait time 228X. In other words, in the present embodiment, because the non-independent adding correction time period 222 and the independent obtaining correction time period 224 are thus concurrent, the wait time 228 can be shorter in comparison to the comparative example. As a result of thus shortening the time period during which information processing is not performed to a target, the productivity of the information processing apparatus 103d can be improved.

Note that the non-independent adding correction time period 222 and the independent obtaining correction time period 224 can be made concurrent by, for example, as depicted in FIG. 22B, placing the non-independent adding correction time period 222 later than the independent obtaining correction time period 223, thus allowing the non-independent adding correction time period 222 to use a result obtained from the earlier independent obtaining correction time period 223.

Although the information processing apparatuses, the image forming apparatuses, information processing methods, and image forming methods have been described with reference to the embodiments, the present invention is not limited to the embodiments, and various variations and modifications can be made within the scope of the present invention.

In the image forming system 100, some of the functions of the image forming apparatus 103 may be provided in an external apparatus, and some or all of the functions of the DFE 102 may be provided in an external apparatus. The external apparatus(es) may be a cloud server(s). The DFE 102 may include some of the functions of the image forming apparatus 103.

The numbers, such as the ordinal numbers, quantities, and the like, used in the description of the embodiments are all provided as examples to facilitate understanding certain concepts underlying the present invention, and the present invention is not limited to the numbers indicated in the described examples. The specified connections between the elements as described are presented as examples to facilitate understanding certain concepts underlying the present invention, and the specified connections that implement the functions of the present invention are not limited to the arrangements as described herein.

With respect to the functional block diagrams, the specific blocks are examples and a plurality of blocks may be implemented by a single block, a single block may be further divided into a plurality of blocks, and/or some of functions of one block may be moved to another block. A plurality of blocks having similar functions may be concurrently implemented or in a time-sharing manner by a single hardware or software unit.

Embodiments of the present invention include an information processing method. For example, the information processing method is executed by an information processing apparatus that performs information processing on a target. The information processing method performs a plurality of processing steps including a first processing step of adding information to the target and a second processing step of obtaining the information, and a control step of controlling each of the plurality of processing steps, wherein the control step includes a correction step of correcting each of the plurality of processing steps, and in the correction step, corrections with respect to the plurality of processing steps are concurrently performed. The same advantageous effects as the advantageous effects of the above-described image forming apparatus and the information processing apparatus can be obtained by the information processing method.

Each of the functions of the embodiments described above may be implemented by one or more processing circuits. As described herein, a "processing circuit" may be a processor programmed to perform each function by software, such as a processor implemented by an electronic circuit; or a device such as an application specific integrated circuit (ASIC), a digital signal processor (DSP), a field programmable gate array (FPGA), or a conventional circuit module, designed to perform each function as described above.

What is claimed is:

1. An information processing apparatus configured to perform information processing on a target, the information processing apparatus comprising:
   processing circuitry configured to
     perform a plurality of processes, the plurality of processes including a first process and a second process, wherein the first process includes adding information to the target and forming an image, and the second process includes obtaining the information and reading the image;
     control each of the plurality of processes; and
     perform a correcting process of concurrently performing corrections with respect to the plurality of processes, wherein
   the processing circuitry is further configured to
     determine whether performing the correcting process is necessary with respect to the reading process; and
     perform, in a case that the processing circuitry determines that the correcting process is necessary, the correcting process with respect to an image forming process.

2. The information processing apparatus according to claim 1, wherein the processing circuitry is further configured to, in the correcting process, perform a correction with respect to a process of the plurality of processes without using information obtained from another process of the plurality of processes.

3. An image forming apparatus, comprising:
   the information processing apparatus according to claim 1, wherein
   the image forming apparatus is configured to form the image on a recording medium.

4. The image forming apparatus according to claim 3, wherein the processing circuitry is further configured to determine a type of a correction with respect to the reading process in accordance with a time required to perform a correction with respect to the image forming process.

5. The image forming apparatus according to claim 3, wherein the processing circuitry is further configured to
   perform the image forming process on a basis of a print job, and
   concurrently perform corrections with respect to the image forming process and the reading process, before performing the image forming process on the basis of the print job.

6. The image forming apparatus according to claim 3, wherein
   the reading process includes a first reading process of reading a first image formed on a first side of the recording medium, and a second reading process of reading a second image formed on a second side of the recording medium, the second side being different from the first side, and
   the processing circuitry is further configured to concurrently perform corrections with respect to the image forming process, the first reading process, and the second reading process.

7. An information processing method executed by an information processing apparatus configured to perform information processing on a target, the information processing method comprising:
   performing a plurality of processes, the plurality of processes including a first process and a second process, wherein the first process includes adding information to the target and forming an image, and the second process includes obtaining the information and reading the image; and
   controlling each of the plurality of processes, wherein
   the controlling each of the plurality of processes includes:
     a correcting process of concurrently performing corrections with respect to the plurality of processes;
     determining whether performing the correcting process is necessary with respect to the reading process; and
     performing, in a case that the determining indicates that the correcting process is necessary, the correcting process with respect to an image forming process.

8. The information processing method according to claim 7, wherein performing the correcting process includes performing a correction with respect to a process included in the plurality of processes without using information obtained from another process included in the plurality of processes.

9. An image forming method, comprising:
   performing the information processing method according to claim 7; and
   forming the image on a recording medium.

10. The image forming method according to claim 9, further comprising determining a type of a correction with respect to the reading process in accordance with a time required to perform a correction with respect to the image forming process.

11. The image forming method according to claim 9, wherein
   in the image forming process, the image is formed on a basis of a print job, and the image forming method further comprises concurrently performing corrections with respect to the image forming process and the reading process, before the image is formed on the basis of the print job in the image forming process.

12. The image forming method according to claim 9, wherein the reading process includes a first reading process of reading a first image formed on a first side of the recording medium, and a second reading process of reading a second image formed on a second side of the recording medium, the second side being different from the first side, and the image forming method further comprises concurrently performing corrections with respect to the image forming process, the first reading process, and the second reading process.

* * * * *